US007014777B2

(12) United States Patent
Ishikawa et al.

(10) Patent No.: US 7,014,777 B2
(45) Date of Patent: Mar. 21, 2006

(54) WASTEWATER TREATMENT CONTROL SYSTEM

(75) Inventors: Takatoshi Ishikawa, Kanagawa (JP); Noboru Sasaki, Kanagawa (JP); Hideo Miyazaki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 80 days.

(21) Appl. No.: 10/379,729

(22) Filed: Mar. 6, 2003

(65) Prior Publication Data

US 2004/0011736 A1 Jan. 22, 2004

(30) Foreign Application Priority Data

Mar. 6, 2002 (JP) ......................... P. 2002-061020
Jun. 28, 2002 (JP) ......................... P. 2002-190496

(51) Int. Cl.
*C02F 3/00* (2006.01)

(52) U.S. Cl. ....................................... 210/739; 210/143

(58) Field of Classification Search ........ 210/739–746, 210/143

See application file for complete search history.

(56) References Cited

U.S. PATENT DOCUMENTS 5,733,454 A * 3/1998 Cummings .................. 210/603
2004/0035770 A1 * 2/2004 Edwards et al. ............ 210/137

FOREIGN PATENT DOCUMENTS

JP 6-261771 A 9/1994
JP 6-296990 A 10/1994
JP 8-289778 A 11/1996
JP 10-156336 A 6/1998
JP 11-77074 A 3/1999
JP 11-256343 A 9/1999

* cited by examiner

*Primary Examiner*—Chester T. Barry
(74) *Attorney, Agent, or Firm*—Birch, Stewart, Kolasch & Birch, LLP

(57) ABSTRACT

A wastewater treatment control system for controlling a wastewater treatment of using a microorganism that can degrade a specific compound, comprises measuring a specific value corresponding to a concentration of the specific compound in wastewater, and controlling the wastewater treatment on the basis of the specific value.

33 Claims, 17 Drawing Sheets

FACTORY 2 | MICROORGANISM ID | 2234

FACTORY 1 | MICROORGANISM ID | 1234

| DATE | TREATMENT TANK 1 | | | TREATMENT TANK 2 | | |
|---|---|---|---|---|---|---|
| | BEFORE TREAT-MENT | AFTER TREAT-MENT | DIFFER-ENCE | BEFORE TREAT-MENT | AFTER TREAT-MENT | DIFFER-ENCE |
| JAN. 1 | 298 | 82 | 216 | 82 | 50 | 32 |
| JAN. 2 | 312 | 90 | 222 | 90 | 60 | 30 |
| JAN. 3 | 250 | 42 | 208 | 42 | 30 | 12 |
| ⋮ | ⋮ | ⋮ | ⋮ | ⋮ | ⋮ | ⋮ |

FACTORY 2 | MICROORGANISM ID | 2234 | ~COD

FACTORY 1 | MICROORGANISM ID | 1234 | ~COD

| DATE | TREATMENT TANK 1 | | | TREATMENT TANK 2 | | |
|---|---|---|---|---|---|---|
| | BEFORE TREAT-MENT | AFTER TREAT-MENT | DIFFER-ENCE | BEFORE TREAT-MENT | AFTER TREAT-MENT | DIFFER-ENCE |
| JAN. 1 | 298 | 82 | 216 | 82 | 50 | 32 |
| JAN. 2 | 312 | 90 | 222 | 90 | 60 | 30 |
| JAN. 3 | 250 | 42 | 208 | 42 | 30 | 12 |
| ⋮ | ⋮ | ⋮ | ⋮ | ⋮ | ⋮ | ⋮ |

FACTORY 2 | MICROORGANISM ID | 2234 | ~BOD

FACTORY 1 | MICROORGANISM ID | 1234 | ~BOD

| DATE | TREATMENT TANK 1 | | | TREATMENT TANK 2 | | |
|---|---|---|---|---|---|---|
| | BEFORE TREAT-MENT | AFTER TREAT-MENT | DIFFER-ENCE | BEFORE TREAT-MENT | AFTER TREAT-MENT | DIFFER-ENCE |
| JAN. 1 | 450 | 90 | 360 | 90 | 80 | 10 |
| JAN. 2 | 430 | 88 | 342 | 88 | 81 | 7 |
| JAN. 3 | 460 | 91 | 369 | 91 | 78 | 13 |
| ⋮ | ⋮ | ⋮ | ⋮ | ⋮ | ⋮ | ⋮ |

| MICROORGANISM ID | TANK | COD PREDETERMINED VALUE | pH PREDETERMINED VALUE |
|---|---|---|---|
| 1234 | TANK 1 | 200 | 5.8 ~ 6.2 |
| | TANK 2 | 80 | 5.8 ~ 6.2 |
| 2234 | TANK 1 | 150 | 6.4 ~ 6.6 |
| | TANK 2 | 60 | 6.4 ~ 6.6 |
| ⋮ | ⋮ | ⋮ | ⋮ |

| MICROORGANISM ID | TANK | COD PREDETERMINED VALUE | BOD PREDETERMINED VALUE | pH PREDETERMINED VALUE |
|---|---|---|---|---|
| 1234 | TANK 1 | 200 | 350 | 5.8 ~ 6.2 |
| | TANK 2 | 80 | 80 | 5.8 ~ 6.2 |
| 2234 | TANK 1 | 150 | 280 | 6.4 ~ 6.6 |
| | TANK 2 | 60 | 60 | 6.4 ~ 6.6 |
| ...... | ...... | ...... | ...... | ...... |

WASTEWATER TREATMENT CONTROL SYSTEM

FIELD OF THE INVENTION

The present invention relates to a wastewater treatment control system, a terminal associated with it, a computer program and an accounting method to wastewater treatment service. In particular, the invention relates to a wastewater treatment control system for controlling from a remote place a plurality of treatment tanks in which wastewater is treated, a terminal, a computer program and an accounting method.

BACKGROUND OF THE INVENTION

In general, activated sludge treatment has been conducted for treatment of organic compounds in industrial wastewater. In recent years, however, compounds that can not be degraded by conventional activated sludge treatment, for example, hardly biodegradable chelating agents including EDTA, organic chlorine compounds including trihalomethanes, and various surfactants of nonyl phenol derivatives, are discharged into nature, which presents a social problem from fear of environmental pollution and an increased burden on the environment. It is difficult to biodegrade these compounds by the conventional activated sludge process, and particularly, when the compounds exist at a high concentration (for example, 200 ppm or more), the adverse effect thereof is profound.

For example, the above-mentioned hardly biodegradable chelating agents are generally used in industrial soap, the photographic industry, the pulp industry and the plating industry. Wastewater containing such hardly biodegradable materials has a high COD value. However, such materials are not degraded by the conventional activated sludge treatment. Accordingly, as a method for treating the wastewater, a dilution method of reducing the concentration of the materials to an effluent control value or less by diluting the wastewater with different water has most generally been used.

In addition, recovery incineration treatment has also been used in some cases.

However, in the dilution method, the cost of water is high, and the total amount of the hardly biodegradable material discharged is not decreased. Further, in the recovery incineration method, the burden of the treating cost is further increased.

For this reason, a treating method of degrading the hardly biodegradable material with a microorganism has been developed, as a wastewater treating method low in the treating cost and essentially decreasing the total amount of the hardly biodegradable material contained. However, in such a treating method, it is difficult to control the microorganism. In particular, when a plurality of treatment tanks are installed, it is necessary to control activity of the microorganism in each tank. It becomes therefore necessary to control the wastewater treatment by an expert. However, it is actually difficult to independently conduct it by each factory unit.

In addition, when the treatment is conducted by mixing a particular microorganism that can degrade the hardly biodegradable compound in a conventional activated sludge tank, it is very difficult to control conditions under which both the microorganism already existing in the activated sludge tank and the particular microorganism newly introduced therein are brought into action. In general, the existing microorganism becomes predominant, and activity of the latter microorganism is lowered in many cases. Accordingly, in such a mixed system, it is necessary to control the conditions for sustaining activity of each microorganism. It becomes therefore necessary to control the wastewater treatment by an expert. However, it is actually difficult to independently conduct it by each factory unit.

Further, in the field of business relating to degradation of hardly biodegradable compounds with microorganisms, rewards have hitherto been reaped by selling the microorganisms. However, the microorganisms are easily proliferated under specific conditions. Accordingly, once the microorganisms are sold, it becomes unnecessary that the purchasers buy them again. The problem is therefore encountered that the wastewater treatment business utilizing such microorganisms for wastewater treatment is not feasible as business. It is therefore a reality that a positive search of the microorganisms for this purpose has not been conducted.

SUMMARY OF THE INVENTION

Then, an object of the invention is to provide a control method that can solve the above-mentioned problems and execute control by an expert from a remote place. Another object of the invention is to provide a central control device for conducting the control method. Still another object of the invention is to provide a program for a computer executing the control. A further object of the invention is to provide an accounting method relating to the execution thereof. These objects are each attained by a combination of features described in each independent clam. Further, each dependent claim specifies a more advantageous specific example of the invention.

Another object of the invention is to provide a wastewater treatment control system that can execute wastewater treatment control essentially reducing the total amount of a hardly biodegradable material, at low cost and moreover even from a remote place. Still another object of the invention is to provide a central control device therefor. Still another object of the invention is to provide a wastewater treatment control program. A further object of the invention is to provide an accounting method relating to the execution thereof.

In the following description of this specification, the term "biodegradation" is also briefly referred to as "degradation", the term "hardly degradable" as "hardly degradable", the term "hardly biodegradable compound" as "specific compound", and the term "microorganism that can degrade the hardly biodegradable compound, that is to say, the specific compound" as "specific microorganism".

The above-mentioned objects are attained by the following constructions and a combination thereof. That is to say, the invention provides the followings.

(1) A wastewater treatment control system for controlling a treatment tank for treating wastewater with a microorganism that can degrade a specific compound, which comprises: a terminal for obtaining data relating to the treatment tank; and a central control device communicating with the terminal through a network, wherein the terminal has: a concentration-measuring unit for measuring a concentration value corresponding to a concentration of the specific compound in the treatment tank; and a transmitting unit for transmitting the concentration value measured by the concentration-measuring unit to the central control device, and the central control device receives the concentration value of the treatment tank from the terminal.

(2) The specific compound means a compound hardly degradable with commonly used activated sludges which include miscellaneous microorganisms.

(3) Further, the treatment tank may have two or more tanks.

(4) A terminal connected through a network to a central control device for controlling a treatment tank for treating wastewater with a microorganism that can degrade a specific compound, the terminal comprising: a concentration-measuring unit for measuring a concentration corresponding to a concentration of the specific compound in the treatment tank; and a transmitting unit for transmitting the concentration value measured by the concentration-measuring unit to the central control device.

(5) A program for a computer connected through a network to a central control device for controlling a treatment tank for treating wastewater with a microorganism that can degrade a specific compound, wherein the program allows the computer to realize: a concentration measuring function of measuring a concentration corresponding to a concentration of the specific compound in the treatment tank; and a transmitting function of transmitting the concentration value measured to the central control device.

(6) A method of accounting for a wastewater treatment service with the wastewater treatment control system according to any one of the items (1) to (5), which comprises accounting in proportion to a reduction in cost by introduction of the wastewater treatment system, compared to cost previously required for draining wastewater.

(7) A central control device for controlling a plurality of treatment tanks for treating wastewater in which the treatment tanks are located in a place physically apart from the central control device, which comprises:

a receiving unit for receiving: a concentration value corresponding to a concentration of a specific compound in each of the treatment tanks before treatment; and a concentration value corresponding to a concentration of the specific compound after treatment, so that the concentration values are associated with each of the treatment tanks;

a computing unit for computing a difference between the concentration value before treatment and the concentration value after treatment received by the receiving unit; and a concentration storing unit for storing difference information indicating the difference between the concentration value before treatment and the concentration value after treatment computed by the computing unit.

(8) The central control device according to the item (7), wherein a microorganism for degrading a material contained in wastewater is added to each treatment tank, and the central control device comprises: a storing unit for storing microorganism-specifying information for specifying the microorganism, so that the information is associated with each of the treatment tanks; and a totaling unit for summarizing the difference between the concentration before treatment and the concentration after treatment computed by the computing unit, for each identical microorganism-specifying information.

The totaling unit may further have an output unit for outputting the totaled information summarized thereby.

(9) A central control device for controlling a plurality of treatment tanks for treating wastewater, which comprises:

a predetermined value-storing unit for storing a predetermined value determined on the basis of a concentration value corresponding to a concentration of a specific compound in each of the treatment tanks, so that the predetermined value is associated with each of the treatment tanks, a receiving unit for receiving difference information specifying a difference between a concentration of the specific compound before treatment and a concentration of the specific compound after treatment;

a comparison unit for comparing the difference between the concentration before treatment and the concentration after treatment specified by the difference information received by the receiving unit, to the predetermined value stored in the predetermined value-storing unit; and a processing unit for conducting predetermined treatment on the basis of the results of comparison by the comparison unit.

(10) A program for a computer for controlling a plurality of treatment tanks for treating wastewater, in which the treatment tanks is located in buildings physically apart from each other, wherein the program allows the computer to realize: a receiving function of receiving a concentration value corresponding to a concentration of a specific compound before treatment and a concentration value corresponding to a concentration of the specific compound after treatment; a computing function of computing a difference between the concentration before treatment and the concentration after treatment which have been received; and a concentration-controlling function of controlling difference information indicating the computed difference between the concentration before treatment and the concentration after treatment.

(11) A program for a computer for controlling a plurality of treatment tanks for treating wastewater, wherein the program allows the computer to realize:

a predetermined value-control function of controlling a predetermined value determined on the basis of a concentration of a specific compound in each of the treatment tanks, so that the predetermined value is associated with each of the treatment tanks;

a receiving function of receiving difference information specifying a difference between a concentration of the specific compound before treatment and a concentration of the specific compound after treatment;

a comparison function of comparing a difference between a concentration value corresponding to the concentration before treatment and a concentration value corresponding to the concentration after treatment, in which the difference is specified by the difference information received, to the predetermined value that has been controlled; and a processing function of conducting a predetermined treatment on the basis of the results of comparison by the comparison function.

(12) A wastewater treatment control system for controlling a wastewater treatment of using an activated sludge tank containing a microorganism that can degrade a hardly biodegradable compound, in which the system comprises: a measuring unit for measuring a BOD value and a characteristic value corresponding to a concentration of the hardly biodegradable compound in wastewater; and a controlling unit for controlling the wastewater treatment on the basis of the BOD value and the characteristic value.

(13) A wastewater treatment control system for controlling a wastewater treatment of using an activated sludge tank containing a microorganism that can degrade a hardly biodegradable compound, wherein the system comprises a terminal for obtaining data for control and a central control device communicating with the terminal through a communication network, the terminal has: a measuring unit for measuring a BOD value and a characteristic value corresponding to a concentration of the hardly biodegradable compound as the data for control; and a transmitting unit for transmitting the data for control measured by the measuring unit to the central control device, and the central control device receives the data for control from the terminal and controls the wastewater treatment on the basis of the data received.

(14). The wastewater treatment control system according to the items (12) or (13), wherein the activated sludge tank comprises two or more tanks.

(15) A terminal connected through a communication network to a central control device for controlling a wastewater treatment of using an activated sludge tank containing a microorganism that can degrade a hardly biodegradable compound, wherein the terminal comprises: a measuring unit for measuring a BOD value and a characteristic value corresponding to a concentration of the hardly biodegradable compound in the activated sludge tank; and a transmitting unit for transmitting the BOD value and the characteristic value, which are measured by the measuring unit, to the central control device.

(16) A program for a computer connected through a communication network to a central control device for controlling a wastewater treatment of using an activated sludge tank containing a microorganism that can degrade a hardly biodegradable compound, wherein the program allows the computer to realize: a concentration measuring function of measuring a BOD value and a characteristic value corresponding to a concentration of the hardly biodegradable compound in the activated sludge tank; and a transmitting function of transmitting the BOD value and the characteristic value measured to the central control device.

(17) A method of accounting for a wastewater treatment service with the wastewater treatment control system according to claim 12, which comprises accounting in proportion to a reduction in treatment cost by introduction of the wastewater treatment system, compared to treatment cost previously required for draining wastewater.

(18) A central control device that can remotely control a plurality of wastewater treatment tanks for treating wastewater, in which the wastewater treatment tanks are located in a place physically apart from the central control device, wherein the central control device comprises:

a receiving unit for receiving a BOD value and a characteristic value corresponding to a concentration of a hardly biodegradable compound in each of the treatment tanks before treatment, and a BOD value and a characteristic value corresponding to a concentration of the hardly biodegradable compound in each of the treatment tanks after treatment, so that the values are associated with each of the treatment tanks;

a computing unit for computing a difference between the BOD values received by the receiving unit before and after treatment, and a difference between the characteristic values before and after treatment; and a difference information storing unit for storing difference information indicating the difference between the BOD values before and after treatment and the difference between the characteristic values before and after treatment, which have been computed by the computing unit.

(19) The central control device according to the item (18), wherein a microorganism for degrading a material contained in wastewater is added to each of the treatment tanks, and the central control device comprises: a storing unit for storing microorganism-specifying information for specifying the microorganism, so that the information is associated with each of the treatment tanks; and a totaling unit for summarizing the difference between the BOD values before and after treatment and the difference between the characteristic values before and after treatment, which have been computed by the computing unit, for each identical microorganism-specifying information.

The totaling unit may further have an output unit for outputting the totaled information summarized thereby.

(20) A central control device for controlling a plurality of treatment tanks for treating wastewater, which comprises:

a predetermined value-storing unit for storing a predetermined value determined on the basis of a BOD value and a characteristic value corresponding to a concentration of a specific compound in each of the treatment tanks, so that the predetermined value is associated with each of the treatment tanks;

a receiving unit for receiving difference information specifying a difference between the BOD values before and after treatment and a difference between the characteristic values before and after treatment, respectively;

a comparison unit for comparing the difference between the BOD values before and after treatment and the difference between the characteristic values before and after treatment, which are specified by the difference information received by the receiving unit, to the predetermined value stored in the predetermined value-storing unit; and a processing unit for conducting predetermined wastewater treatment on the basis of the results of comparison by the comparison unit.

(21) A program for a computer for controlling a plurality of treatment tanks for treating wastewater, in which the treatment tanks are located in buildings physically apart from each other, wherein the program allows the computer to realize: a receiving function of receiving BOD values and characteristic values corresponding to concentrations of a specific compound before and after treatment; a computing function of computing a difference between the BOD values before and after treatment and a difference between the characteristic values before and after treatment, which have been received; and a concentration-controlling function of controlling difference information indicating the difference between the BOD values before and after treatment and the difference between the characteristic values before and after treatment, which have been computed.

(22) A program for a computer for controlling a plurality of treatment tanks for treating wastewater, wherein the program allows the computer to realize: a predetermined value control function of controlling each predetermined value determined on the basis of a BOD value and a concentration of a hardly biodegradable compound in each of the treatment tanks, so that the predetermined value is associated with each of the treatment tanks; a receiving function of receiving difference information specifying a difference between the BOD values before and after treatment and a difference between the concentrations of the hardly biodegradable compound before and after treatment in each of the treatment tanks; a comparison function of comparing the difference between the BOD values before and after treatment, and the difference between the concentrations of the hardly biodegradable compound before and after treatment, which are specified by the difference information received, to the predetermined value that is controlled; and a processing function of conducting predetermined treatment on the basis of the results of comparison by the comparison function.

The above-mentioned respective aspects do not enumerate all of the features of the wastewater treatment control system, the terminal associated with it, the computer program and the accounting method for wastewater treatment service, which are necessary for the invention. The invention also includes combinations of the features of these various aspects.

The wastewater treatment control system means a system in which treatment control elements such as a wastewater treatment apparatus, a measuring unit for controlling the apparatus, a transmitting means of measured data, a computing unit for establishing conditions from the measured data and a control unit for controlling treatment conditions from computed results are linked in such a form that they organically function. The invention relates to the system having the above-mentioned constitution and features, and the system elements (treatment control elements) thereof. Details thereof will become apparent from the following description.

The wastewater for which the wastewater treatment control system of the invention is intended is wastewater containing a hardly biodegradable compound, and the invention is characterized by that the hardly biodegradable compound can be degraded and removed at low cost. At the same time, the invention is further characterized by that the BOD value of wastewater containing a biodegradable material together with the hardly biodegradable compound can be reduced.

BRIEF DESCRIPTION OF THE DRAWINGS

FIG. 7 shows one example of a data format of a measured value data base 534.

FIG. 8 shows one example of a data format of a measured value data base 534. FIG. 8A shows a data format for a COD value, and FIG. 8B shows a data format for a BOD value.

FIG. 10 shows one example of a data format of a predetermined value data base 536.

FIG. 11 shows one example of a data format of a predetermined value data base 536.

DESCRIPTION OF REFERENCE NUMERALS AND SIGNS

Figure 1:
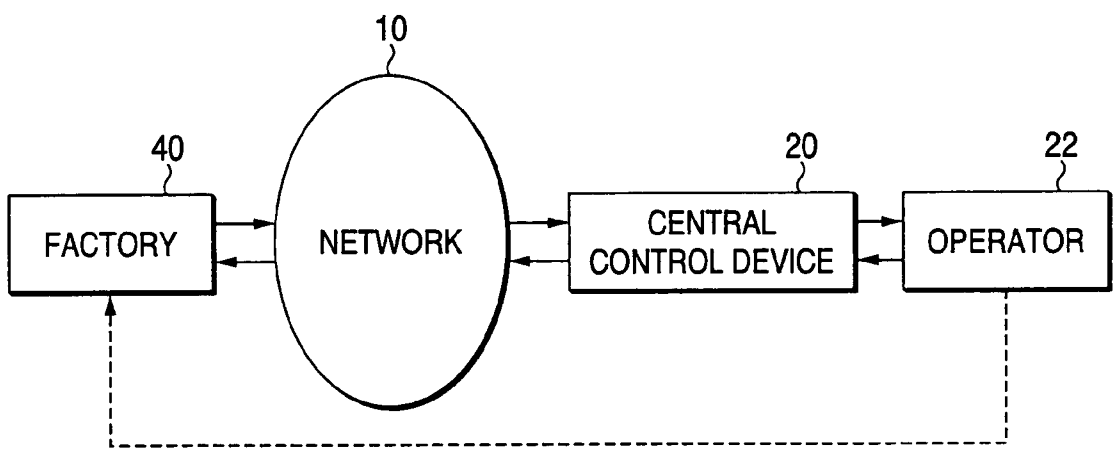
FIG. 1 is a block diagram showing an outline of a central control system.

10: Wastewater Treatment Apparatus
20: Central Control Device
30: Factory Terminal
40: Factory
110: First COD-Measuring Unit
111: First BOD-Measuring Unit
200: First Section of Treatment Tank
210: Adding Unit
220: pH-Adjusting Unit
230: Stirring Unit
240: Filter
250: Second COD-Measuring Unit
251: Second BOD-Measuring Unit
300: Second Section of Treatment Tank
310: Adding Unit
320: pH-Adjusting Unit
330: Stirring Unit
340: Filter
350: Third COD-Measuring Unit
351: Third BOD-Measuring Unit
450: Drain Pump
460: Wastewater Control Tank
500: Receiving Unit
502: Output Unit
504: Totaling Unit
506: Photographed Image-Obtaining Unit
508: pH Value-Obtaining Unit
510: Judging Unit
512: COD-Obtaining Unit
513: BOD-Obtaining Unit
514: Computing Unit
516: Comparison Unit
518: Processing Unit
520: Input Unit
532: Image Data Base
534: Measured Value Data Base
536: Predetermined Value Data Base
600: COD-Measuring Unit
601: BOD-Measuring Unit
602: pH-Measuring Unit
604: Imaging Unit
606: Adding Unit I
607: Adding Unit II
608: pH-Adjusting Unit
610: Display Unit
612: Transmitting Unit
614: Receiving Unit
616: Processing Unit
712: Floppy Disk Drive
714: Floppy Disk
716: CD-ROM Drive
718: CD-ROM
812: Floppy Disk Drive
814: Floppy Disk
816: CD-ROM Drive
818: CD-ROM

DETAILED DESCRIPTION OF THE INVENTION

While the invention will be described below with reference to embodiments thereof, it is to be understood that the following description is for illustrative purpose only and does not limit the scope of the invention.

Further, in the invention relating to wastewater treatment using the activated sludge tank, the degradation of the hardly biodegradable compound with the microorganism is conducted, together with biodegradation with activated sludge, in the activated sludge tank. Accordingly, the activated sludge tank is also called a wastewater treatment tank or simply a treatment tank. However, these tanks mean the same one.

The hardly biodegradable compound to be degraded and removed from wastewater by an embodiment of the invention, that is to say, the specific compound, means a compound that is hardly degraded with conventional activated sludge, for example a compound having a biodegradation rate of 50% when a degradation test is conducted by the MITI method. Above all, the wastewater treatment control system of the invention is particularly effective in removing a compound having a biodegradation rate as low as 25% or less, further 15% or less or still further 10% or less measured by the above-mentioned test method.

The hardly degradable compound-containing wastewater for which an embodiment of the invention is intended means wastewater containing the specific compound at such a concentration level that the wastewater cannot be discharged as it is. Specific examples thereof include industrial soap-containing wastewater containing the specific compound in an amount exceeding a regulated COD value, photographic processing-related wastewater containing an organic aminocarboxylic acid such as EDTA (ethylenediaminetetraacetic acid), DTPA (diethylenetriaminepentaacetic acid) or PDTA (1,3-propanediaminetetraacetic acid), hardly biodegradable chelating agent-containing wastewater discharged from facilities of the pulp industry or the plating industry, particularly, electroless plating wastewater, surfactant-containing wastewater discharged from facilities handling detergents for industrial use or domestic use containing nonyl phenol surfactants, organic chlorine compound (solvent)-containing wastewater discharged from facilities of the electric industry or the machinery industry, organic solvent-containing wastewater discharged from organic chemical factories and washing wastewater of the food industry. However, the wastewater for which the invention is intended is not limited thereto, and may be any as long as it contains the hardly biodegradable organic compound, that is to say, the specific compound, at such a level that it can not be directly discharged.

Although the COD value of wastewater of this type exceeds an effluent control level in an area in question, it extends from 20 ppm to tens of thousands of parts per million in many cases, and from about 100 ppm to about 1000 ppm in more cases.

It is possible to determine the concentration of the specific compound itself by various analysis methods including liquid chromatography. However, the characteristic value corresponding to the concentration of the specific compound is a characteristic value that can be used in place of the concentration. For example, it is the COD value at the time when the COD value acts for the concentration. As the alternative characteristic value, the COD value is most preferred in that it can be determined by automatic analysis for a short period of time. When the COD value is used as the alternative characteristic value, any of $COD_{Mn}$, $COD_{OH}$ and $COD_{Cr}$ specified in JIS K0102 (Factory Effluent Test Method), sections 17, 19 and 20 may be used as the COD, as long as any of them or a characteristic corresponding thereto is selected, or as long as one is selected in one wastewater treatment control system.

Devices for measuring the COD value include but are not limited to, for example, commercially available devices such as OD-1000/1100 manufactured by COS, CODA-211/212 manufactured by HORIBA and a Hiranuma fully automatic COD measuring device, COD-1500, manufactured by Hitachi High Technologies Co., Ltd. Any one may be used as long as it is a device with which the COD value can be measured.

The BOD value is basically measured on the basis of a BOD measuring method specified in JIS K0102 (Factory Effluent Test Method), section 21. However, this is unsuitable and impractical for steadily proceeding with the wastewater treatment control in many cases, in terms of time and labor required for the measurement of the $BOD_5$ value. It is therefore rather actual to employ the dissolved oxygen concentration (DO) or the compacted BOD value such as the $BOD_1$ value, for which the relationship with the BOD5 is grasped for each type of wastewater. Dissolved oxygen concentration (DO) measuring devices are used as simple BOD meters, which include, for example, an ICH automatic DO measuring device manufactured by Core Chushikoku Company and an automatic BOD measuring device manufactured by Nippon Kankyo Gijutsu Co. Ltd. All of these devices rapidly determine the dissolved oxygen concentration as the alternative characteristic value of the BOD by electrolysis.

Further, data on the first day in the measurement of the $BOD_5$ in accordance with JIS K0102 may be utilized as the $BOD_1$. Measuring devices available in that case include, for example, a five-day work week-correspondence type BOD measuring device manufactured by Nippon Kankyo Gijutsu Co. Ltd.

Also when these alternative characteristic values of the $BOD_5$ are used, it is to be understood that measured values thereof are called the BOD value.

It is preferred that the measurement of the concentration, the COD and BOD values of the specific compound or the alternative characteristic value thereof is made at both of an inlet and an outlet of each activated sludge tank. In the case of a two-tank type activated sludge tank, the measurement is desirably made at three positions, an inlet of a first tank, an outlet of the first tank (the same as an inlet of a second tank) and an outlet of the second tank. The method of conducting the treatment in a plurality of treatment tanks is a preferred embodiment, because the microorganism can be easily optimized, resulting in space savings and short-time degradation treatment. Above all, the two-tank type treatment tank is preferred.

The microorganism that can degrade the above-mentioned specific compound, that is to say, the specific microorganism will be described below. As to the specific microorganism, for each specific compound, there is a specific degrading bacterium that can degrade it, and there is a combination of a certain specific compound and the specific microorganism compatible with the specific compound.

For example, when the specific compounds are aromatic hydrocarbon compounds (for example, a phenol), organic solvents (for example, toluene and trichloroethylene) or organic chlorine compounds (for example, dioxin and PCB), bacteria belonging to *Pseudomonas* and microorganisms belonging to *Methylosinus, Methylomonas, Methylobacterium, Hethylocystis, Alcaligenes, Mycobacterium, Nitrosomonas, Xanthomonas, Spirillum, Vibrio, Bacterium, Achromobacter, Acinetobacter, Flavobacterium, Chromobacterium, Desulfovibrio, Desulfotomaculum, Micrococcus, Sarcina, Bacillus, Streptomyces, Nocardia, Corynebacterium, Pseudobacterium, Arthrobacter, Brevibacterium, Sac-*

*charomyces and Lactobacillus*, which can degrade them, can be used as the specific microorganisms.

As for the specific microorganisms having ability to degrade metal chelating agents such as EDTA and heavy metal chelates in which the metal chelating agents are attached to heavy metals by complex bonding, bacteria belonging to *Bacillus* include *Bacillus editabidus, Bacillus subtilis, Bacillus megaterium* and *Bacillus sphaericus*. These are easily available, for example, as *Bacillus editabidus*-1 (National Institute of Advanced Industrial Science and Technology, FERM P-13449), *Bacillus substilis* NRIC 0068, *B. megaterium* NRIC 1009 and *B. sphaericus* NRIC 1013.

Different specific microorganisms having ability to degrade EDTA include *Pseudomonas* and *Alcaligenes* described in JP-A-58-43782 (the term "JP-A" as used herein means an "unexamined published Japanese patent application"), bacterial strains of *Agrobacterium* described in *Applied and Environmental Microbiology*, 56, 3346–3353 (1990) and Gram-negative isolates described in *Applied and Environmental Microbiology*, 58, No. 2, 671–676 (February, 1992). Of these, for example, *Pseudomonas editabidus* is available as *Pseudomonas editabidus*-1 (FERM P-13634).

Still different microorganisms having activity to degrade EDTA include *Bacillus editabidus* and *Mesophilobacter editabidus* that are marine bacteria. This organic aminocarboxylic acid-degrading bacterium, *Bacillus editabidus*, is a strain to which *Bacillus editabidus*-M1 (FERM P-14868) and *Bacillus editabidus*-M2 (FERM P-14869) belong. Further, the organic aminocarboxylic acid-degrading bacterium, *Mesophilobacter editabidus*, is a strain to which *Mesophilobacter editabidus*-M3 (FERM P-14870) belongs.

Surfactant-degrading bacteria include, for example, *Pseudomonas fluorescence* 3p (atcc31483) described in U.S. Pat. No. 4,274,954. The wastewater to which these microorganisms are to be applied is, for example, wastewater containing an anionic, nonionic or cationic surfactant, especially wastewater containing a poorly biodegradable surfactant called a so-called hard surfactant, above all, wastewater containing a sulfonic acid group-containing surfactant.

Microorganisms that degrade phenols or cresol compounds include, for example, *Pseudomonas putida* cb-173 (atcc31800) described in U.S. Pat. Nos. 4,352,886 and 4,556,638. The wastewater to which these microorganisms are to be applied is, for example, wastewater from phenol resin factories, wastewater from cresol resin factories, wastewater from factories of polyphenols obtained from bisphenol A or the like, and phenol-containing wastewater discharged from plate-making processes or photoresist formation processes in which these phenolic resins are employed.

As for the specific microorganism to be added, in addition to the above-mentioned microorganism already isolated, one newly screened from soil depending on the purpose can also be utilized. A mixed system of a plurality of strains may also be used. In the case of the microorganism separated by screening, it may be one unidentified.

When the wastewater treatment tank has a plurality of activated sludge tanks, the specific microorganism is preferably added to a second tank or later. Further, when the wastewater treatment tank has one activated sludge tank, it is a preferred embodiment that the specific microorganism is added to a latter part of a flow path. However, an embodiment of adding the specific microorganism to a beginning part of the treatment tank is not excluded.

The amount of the microorganism added is from 100 g to 50 kg, and preferably from 500 g to 5,000 g, per cubic meter of wastewater, by the dry weight of the microorganism. In this embodiment, the microorganism may be added either directly or in a state where the microorganism is immobilized on a carrier. The term "carrier" as used herein means a medium for fixing the microorganism, and it is, for example, activated carbon particles, carbon fiber or a polymer gel. The use of the carrier is a more preferred embodiment because of enhanced activity of the microorganism. Further, in place of the microorganism, a splitting enzyme contained in the microorganism may be added.

As methods for comprehensively immobilizing the microorganism, various known methods can be used. Most generally, the methods include a method of immobilizing a microorganism in an aqueous gel of a synthetic polymer (described in JP-A-10-263575). A method of immobilizing a microorganism on activated carbon particles (described in JP-A-11-77074) and a method of immobilizing a microorganism on a carbon fiber cloth (described in JP-A-11-207379) may also be used.

The volume of the treatment tank for treating the wastewater varies depending on the amount of the wastewater. For example, the residence time of the wastewater in the treatment tank is adjusted to about 0.2 day to about 20 days. In particular, it is preferred that the residence time of the wastewater in the treatment tank is adjusted to about 0.5 day to about 5 days. The plurality of treatment tanks may be installed. The installation of the plurality of treatment tanks makes it possible to treat the wastewater more efficiently in small space for a short period of time.

When degrading ability of the specific microorganism in the wastewater treatment tank is lowered, or when biodegrading ability is lowered, a nutrient source (also referred to as a nutriment) for the specific microorganism or for the microorganism in activated sludge is supplied to the treatment tank. In this case, the nutrient source for the specific microorganism and that for the microorganism inactivated sludge are common in many cases. Further, instead of supplying the nutrient source, the amount of the specific microorganism added may be increased, or the amount of activated sludge returned maybe increased. Depending on a state of degradation behavior of the treatment tank, it is decided which is employed, the supply of the nutrient source or the increase in the amount of the microorganism.

When degrading ability of the specific microorganism is lowered, the nutrient source for the specific microorganism is added to the treatment tank, preferably to the latter part of the flow path of the treatment tank. Particularly, an organic nutrient source giving a nutrient source suitable for growth of the specific microorganism, and/or a nutrient source comprising an inorganic salt is added to the treatment tank. Examples of the organic nutrient sources added include polypeptones, yeast extract, meat extract and molasses. Examples of the inorganic nutrient sources added include various types of phosphates and magnesium salts. For example, the organic nutrient source is added in an amount of 0.001 to 5% by weight, and the inorganic nutrient source is added in an amount of 0.1 to 1% by weight based on the organic nutrient source. More preferably, the organic nutrient source is added in an amount of 0.01 to 1% by weight, and the inorganic nutrient source is added in an amount of 0.1 to 1% by weight based on the organic nutrient source.

Further, in the wastewater treatment apparatus, the specific microorganism itself may be added in place of the nutrient source. The type of specific microorganism added herein is similar to that of the specific microorganism preliminarily added, so that the explanation thereof is omitted. Furthermore, in the wastewater treatment apparatus, the specific microorganism may be added in a state where the specific microorganism is immobilized on a carrier, or directly without immobilization thereof on a carrier.

On the other hand, when activity (biodegradability) of the activated sludge (not the specific microorganism) is lowered, the nutrient source for the microorganism in the activated sludge is supplied to the treatment tank (preferably, to the first tank when the plurality of treatment tank are used, and to a foremost part of a flow path, when the tank has the flow path). Specifically, the nutrient sources for the microorganisms in the activated sludge are the same as the above-mentioned nutrient sources for the specific microorganisms. In place of addition of the nutrient source, the amount of sludge returned may be increased. Further, both the nutrient source and the sludge microorganism may also be supplied.

In the wastewater treatment apparatus as used herein, sludge containing a microorganism having biodegradability is added to the treatment tank in an amount of 10 g to 50 kg, and more preferably in an amount of 20 g to 5000 g, per cubic meter of wastewater, by the dry weight.

In the wastewater treatment apparatus, the nutrient source, the sludge or the specific microorganism is added with stirring a solution in the treatment tank. For example, when the nutrient source or the microorganism is a liquid, it is added from a solution tank or a container through a solution supply pump or by hand while stirring the solution in the treatment tank by aeration or with a stirrer. When the nutrient source or the microorganism is a solid such as a powder, it is introduced into the treatment tank through an introduction hopper or a conveying instrument. The microorganism or the nutrient source is more uniformly dispersed in the solution in the treatment tank by adding the microorganism or the nutrient source while stirring the solution in the tank.

Further, in the wastewater treatment apparatus, both the nutrient source and the microorganism may be added to the treatment tank. In a most preferred embodiment, changes in COD value are confirmed for several days after addition of the nutrient source, and when the degree of lowered activity of the microorganism is not recovered, the microorganism is added. At this time, when further addition of the microorganism does not recover the degree of lowered COD value, the wastewater may be diluted. This allows the wastewater treatment apparatus to discharge the wastewater surely decreased in COD value.

Wastewater treatment business in which wastewater containing such hardly biodegradable materials is treated with microorganisms includes a method of selling the microorganisms to users conducting wastewater treatment. However, when the microorganisms are proliferated, once the users buy the microorganisms, additional buying becomes unnecessary. It is therefore difficult to continue the business of selling the microorganisms, resulting in infeasibility of the business. Further, professional control of the microorganisms in the treatment tanks becomes necessary, so that it is preferred that control service is added.

To the users, merits of introducing this system are merely a reduction in the amount of diluent water that has previously been used (cost reduction due to water savings) and reduction of cost that has previously been required for recovery and incineration. It is therefore preferable to get a reward obtained by multiplying the cost reduced than before by a specific rate, in compensation for the introduction of this system. In particular, it is more preferable to get a reward obtained by multiplying the cost reduction due to water savings by a specific rate.

For the meantime, in the degradation treatment method using the microorganism, the efficiency thereof inevitably fluctuates depending on environmental conditions (such as atmospheric temperature, water temperature and wastewater concentration). According to this accounting method, even in the unlikely event that this system is not activated at all for some reason, the treatment of wastewater is possible by dilution or recovery incineration in the same manner as before the introduction of this system. In such a state, therefore, the cost charged by the users becomes zero (the same as the state before the introduction), and the risk of the users involved in the introduction of this system goes away.

The invention will be illustrated below with reference to embodiments, but it is to be understood that the following embodiments do not limit the scope of the invention. All combinations of features illustrated in the embodiments are not necessarily indispensable to means for solving the problems.

FIG. 1 is a block diagram showing an outline of a central control system. A factory 40 periodically measures the COD and/or BOD values of wastewater before and after treatment and the pH value of a solution in a treatment tank for treating the wastewater, and transmits them to a central control device 20. Here, the factory 40 may measure water temperature, an image, TOC, the date of measurement and the like, in addition to the COD and/or BOD values, and the pH value. Further, it may take a photograph of a state of the treatment tank with a photographing device such as a digital camera, and periodically transmit image data to the central control device 20.

In particular, the factory 40 transmits both the COD and/or BOD values before treatment of the wastewater and the COD and/or BOD values after treatment to the central control device 20.

The term "factory" as used herein means a wastewater treatment plant, which includes an urban sewage-treatment plant, a wastewater treatment plant of a large-scale facility and a terminal treatment plant of a manufacturing facility.

An operator 22 confirms data received from the factory 40 by the central control system 20, and judges whether the operator makes contact with the factory 40 or not. When the operator 22 makes contact with the factory 40, the operator may enter to the central control device 20 information indicating an instruction to the factory 40, or may directly make contact with the factory 40 by telephone without entering the information in the central control device 20.

For example, the central control device 20 may directly control the pH of the solution in the treatment tank by automatic addition of an acid or an alkali according to the input of the operator 22, or may transmit to the factory 40 the pH value of the solution in the treatment tank, information indicating the amount of an acid or an alkali to be added, or instruction information indicating that the pH is to be controlled. Further, the central control device 20 may automatically add the nutrient source for the microorganism.

Figure 2:
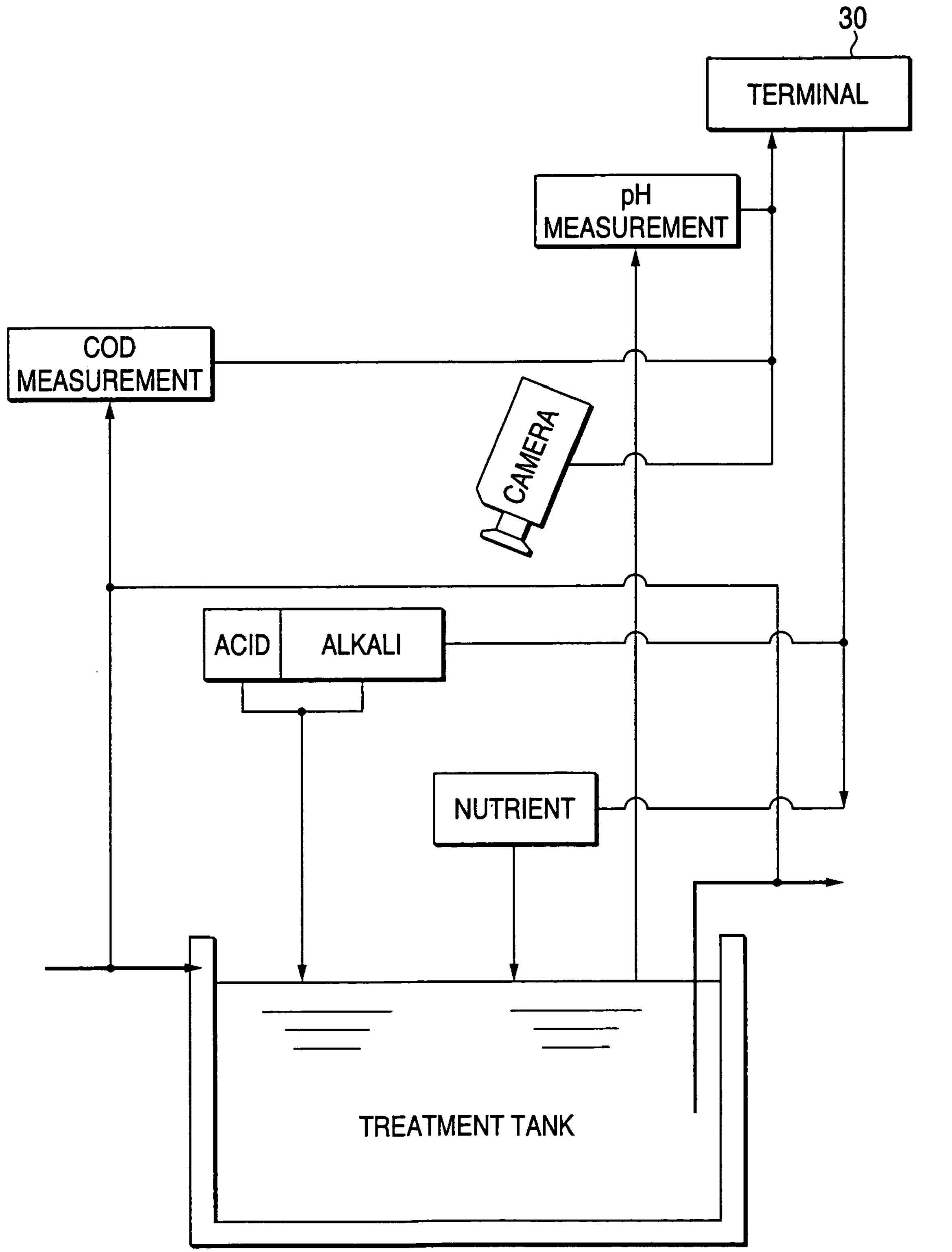
FIG. 2 is a block diagram showing an outline of a wastewater treatment apparatus having a treatment tank for treating wastewater.

FIG. 2 is a block diagram showing an outline of a wastewater treatment apparatus. The wastewater treatment apparatus comprises a factory terminal 30, a treatment tank and incidental equipment of the treatment tank. The factory terminal 30 transmits instruction information to the incidental equipment of the treatment tank or receives measurement information from the incidental equipment to control the treatment tank. The wastewater treatment apparatus according to an embodiment of the invention degrades the hardly biodegradable material contained in the wastewater with the microorganism to reduce the COD concentration of the wastewater. Specifically, the wastewater treatment apparatus generally cuts the COD value of the wastewater having a COD value of 200 ppm to thousands of parts per million in half to about 100 ppm.

Figure 3:
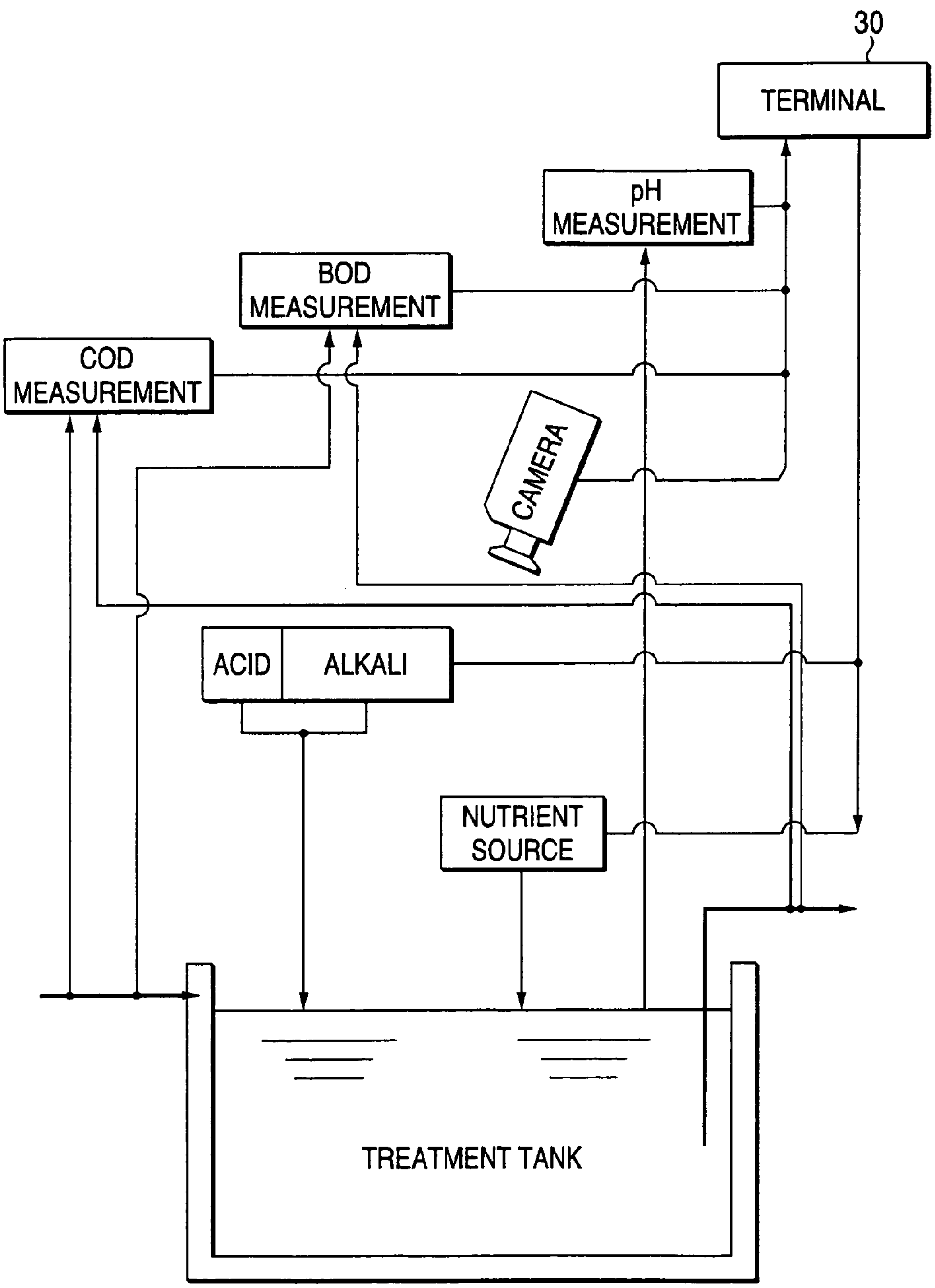
FIG. 3 is a block diagram showing an outline of a wastewater treatment apparatus having a treatment tank for treating wastewater.
Figure 4:
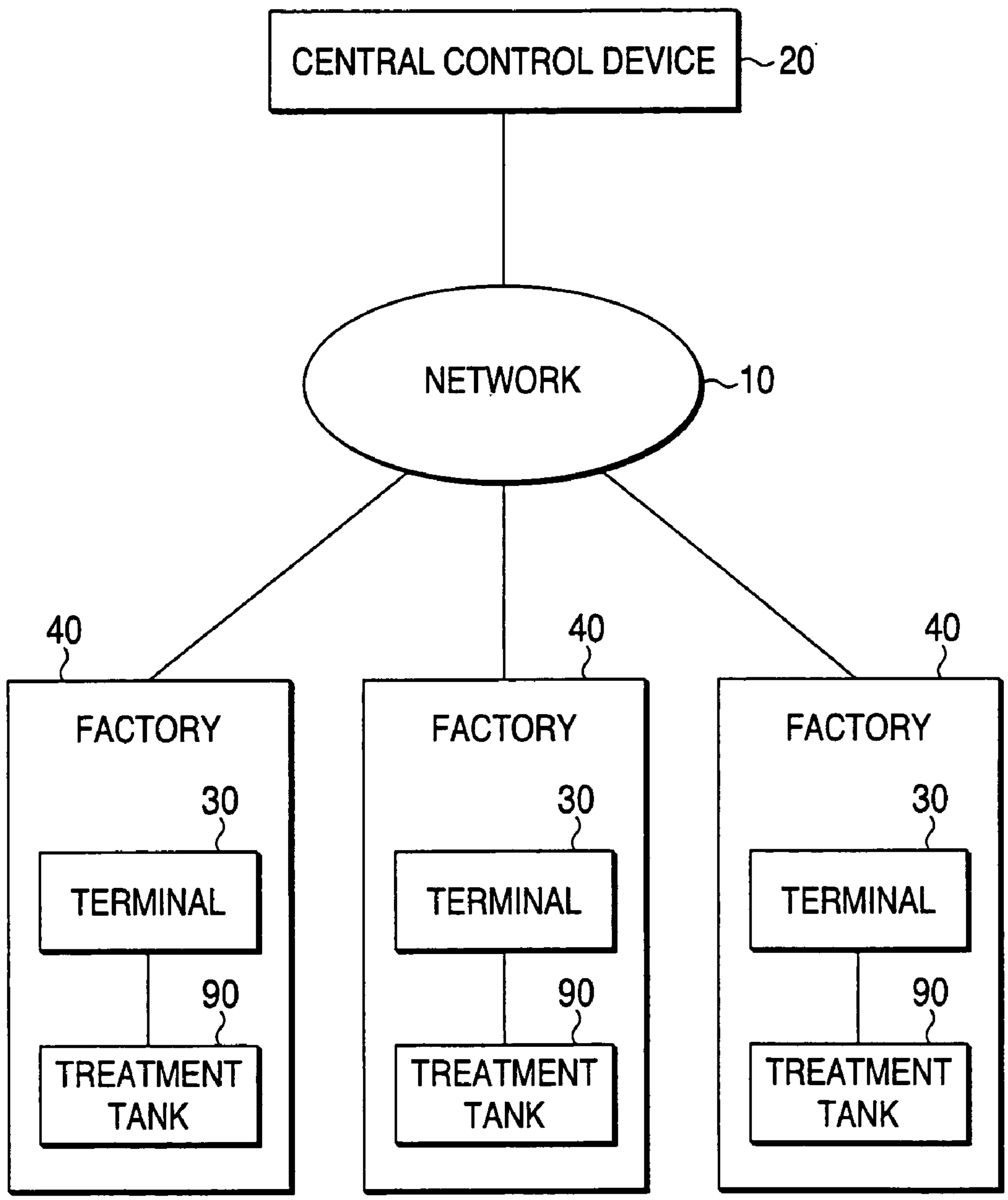
FIG. 4 is a block diagram showing the whole of the central control system embodying the invention.

FIG. 3 is a block diagram showing an outline of a wastewater treatment apparatus. The wastewater treatment apparatus comprises a factory terminal 30, a treatment tank and incidental equipment of the treatment tank. The factory terminal 30 transmits instruction information to the incidental equipment of the treatment tank or receives measurement information from the incidental equipment to control the treatment tank. The wastewater treatment apparatus according to an embodiment of the invention degrades the hardly biodegradable material contained in the wastewater with the microorganism to reduce the COD concentration of the wastewater. Specifically, the wastewater treatment apparatus generally cuts the COD value of the wastewater having a COD value of 200 ppm to thousands of parts per million in half to about 100 ppm, thus satisfying a control level in an area in question.

At the same time, the wastewater treatment apparatus degrades a material responsible for the BOD value contained in the wastewater by activated sludge. Specifically, the wastewater treatment apparatus reduces the BOD value of the wastewater generally having a BOD value of 200 ppm to thousands of parts per million to an effluent standard (in many cases, 160 ppm or less) or lower, or a control value of a sewage effluent standard (in many cases, from 300 to 600 ppm or less) or lower, in an area in question.

Figure 5:
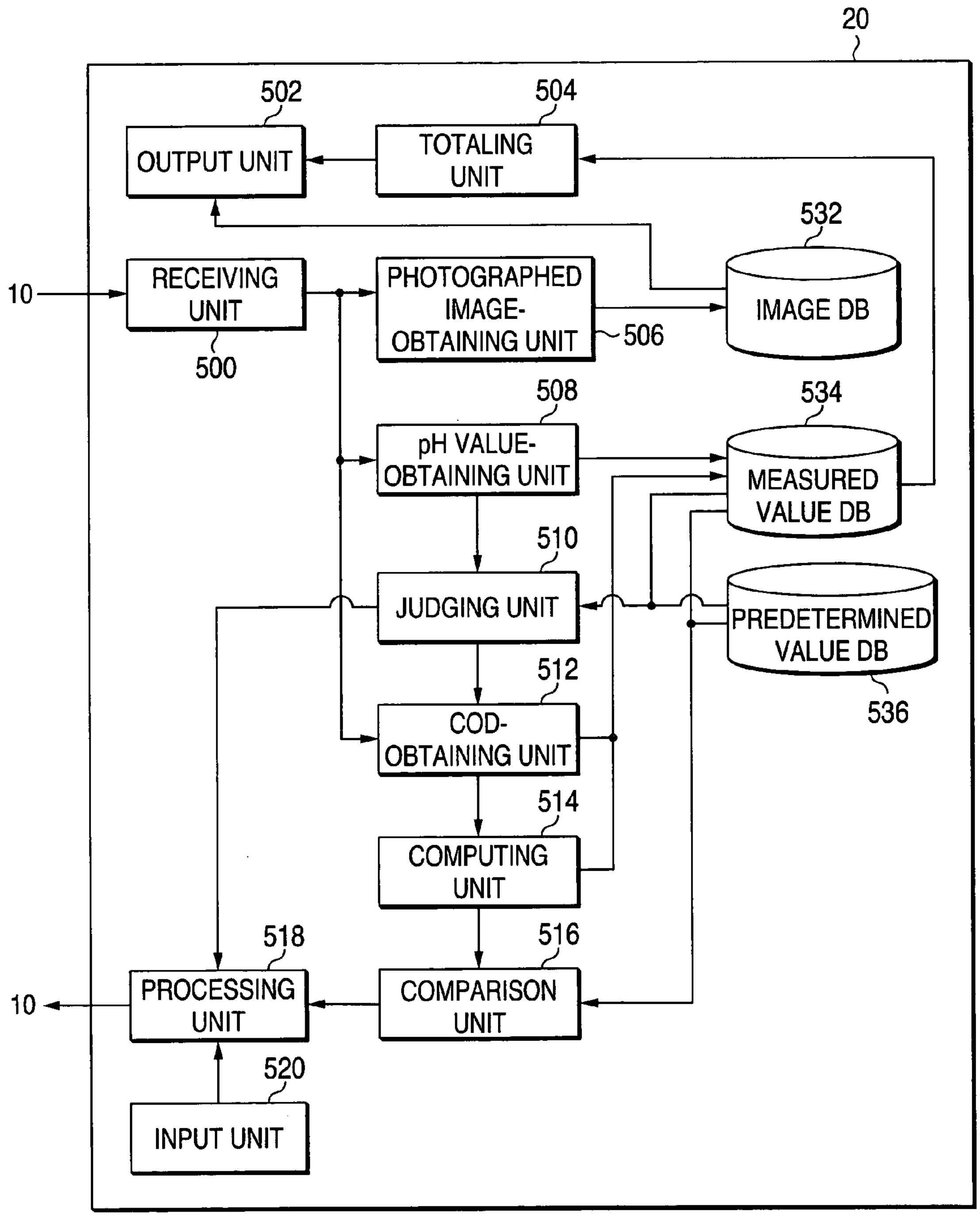
FIG. 5 is a block diagram showing the functional constitution of a central control device 20.

FIG. 5 is a block diagram showing the functional constitution of the central control device 20. The central control device 20 has a receiving unit 500, an output unit 502, a totaling unit 504, a photographed image-obtaining unit 506, a pH value-obtaining unit 508, a judging unit 510, a COD-obtaining unit 512, a computing unit 514, a comparison unit 516, a processing unit 518, an input unit 520, an image data base 532, a measured value data base 534 and a predetermined value data base 536.

The image data base 532 stores image data of an image obtained by photographing a state of the treatment tank 90, in a state where the data is matched to microorganism ID identifying a microorganism. The measured value data base 534 stores a COD concentration of the wastewater before treatment and a COD concentration of the wastewater after treatment in a state where the values are coordinated to the microorganism ID and a factory number. The predetermined value data base 536 stores a COD predetermined value that is a value preliminarily determined with respect to a COD concentration, and a pH predetermined value that is a value preliminarily determined with respect to a pH value. As the pH predetermined value, a value within the range centered at a pH value suitable for a microorganism is stored.

The receiving unit 500 receives the factory number identifying the factory 40, the image data, the pH value and the COD concentrations from the factory terminal 30 for each treatment tank. Here, the receiving unit 500 receives the COD concentration of the wastewater before treatment and the COD concentration of the wastewater after treatment as COD concentrations. The receiving unit 500 transmits the image data and the factory number received to the photographed image-obtaining unit 506. Further, the receiving unit 500 transmits the pH value and the factory number received to the pH value-obtaining unit 508. Furthermore, the receiving unit 500 transmits the COD concentrations and the factory number to the COD-obtaining unit 512.

The photographed image-obtaining unit 506 stores the received image data in the image data base 532 in a state where the data is matched to the factory number. The pH value-obtaining unit 508 stores the received pH value in the measured value data base 534 in a state where the value is matched to the factory number. Further, the pH value-obtaining unit 508 transmits the received pH value and the factory number to the judging unit 510. The COD-obtaining unit 512 stores the received COD values in the measured value data base 534 in a state where the values are matched to the factory number. Further, the COD-obtaining unit 512 transmits the received COD values and the factory number to the computing unit 514.

The judging unit 510 extracts the microorganism ID from the measured value data base 534, the microorganism ID being stored in a state where the ID is matched to the factory number received from the pH value-obtaining unit 508. The microorganism ID is one example of microorganism-specifying information specifying a microorganism. Then, the judging unit 510 extracts the pH predetermined value from the predetermined value data base 536, the pH predetermined value being stored in a state where the value is matched to the microorganism ID. Then, the judging unit 510 judges whether the pH value received from the pH value-obtaining unit 508 is included in the pH predetermined value extracted from the predetermined value data base 536 or not. When the judging unit 510 judges that the pH value received from the pH value-obtaining unit 508 is not included in the pH predetermined value extracted from the predetermined value data base 536, the judging unit transmits the pH predetermined value, the pH value received from the pH value-obtaining unit 508 and the factory number to the processing unit 518.

The processing unit 518 calculates a pH difference by subtracting an intermediate value of the pH predetermined values received from the judging unit 510, from the pH value. The processing unit 518 transmits an instruction to add an acid to the treatment tank 90, when the pH difference calculated is a positive number, and an instruction to add an alkali to the treatment tank 90, when the pH difference calculated is a negative number, together with the pH difference, to the factory terminal 30 specified by the factory number.

The computing unit 514 receives the COD concentrations and the factory number from the COD-obtaining unit 512. The computing unit 514 subtracts the COD concentration after treatment from the COD concentration before treatment to calculate a COD difference. The computing unit 514 stores the calculated COD difference in the measured value data base 534 in a state where the difference is matched to the factory number. Further, the computing unit 514 transmits the calculated COD difference and the factory number to the comparison unit 516.

The comparison unit 516 extracts the microorganism ID from the measured value data base 534, the microorganism ID being stored in a state where the ID is matched to the factory number received. Then, the comparison unit 516 extracts the COD predetermined value stored in a state where the values are coordinated to the microorganism ID extracted. Then, the comparison unit 516 compares the extracted COD predetermined value with the COD difference received from the computing unit 514. When the COD difference is judged to be less than the COD predetermined value, the comparison unit 516 transmits less-than-predetermined-value information indicating that the COD difference is less than the COD predetermined value, together with the COD difference and the factory number, to the processing unit 518. The processing unit 518 transmits the received less-than-predetermined-value information and the COD difference to the factory terminal 30 specified by the factory number.

The totaling unit 504 summarizes the measured values stored in the measured value data base 534 for each microorganism ID. Specifically, the totaling unit 504 extracts the COD difference for each microorganism ID, and calculates an average value. Further, the totaling unit 504 may integrate the COD difference for each microorganism ID. Furthermore, the totaling unit 504 may calculate the rate of change in the COD difference. Thus, the totaling unit 504 totals the measured values stored in the measured value data base 534, and transmits results thereof to the output unit 502.

The output unit 502 outputs the results of totaling received from the totaling unit 504. Further, the output unit 502 extracts the image data from the image data base 532, and displays it. The operator of the central control device 20 inspects an image displayed. When an abnormality is discovered in the image displayed, the operator enters abnormality information indicating the abnormality and the factory number in the input unit 520. When the input unit 520 accepts the abnormality information, it transmits the factory number and the abnormality information to the processing unit 518. The processing unit 518 transmits the received abnormality information to the factory terminal 30 specified by the factory number.

Figure 6:
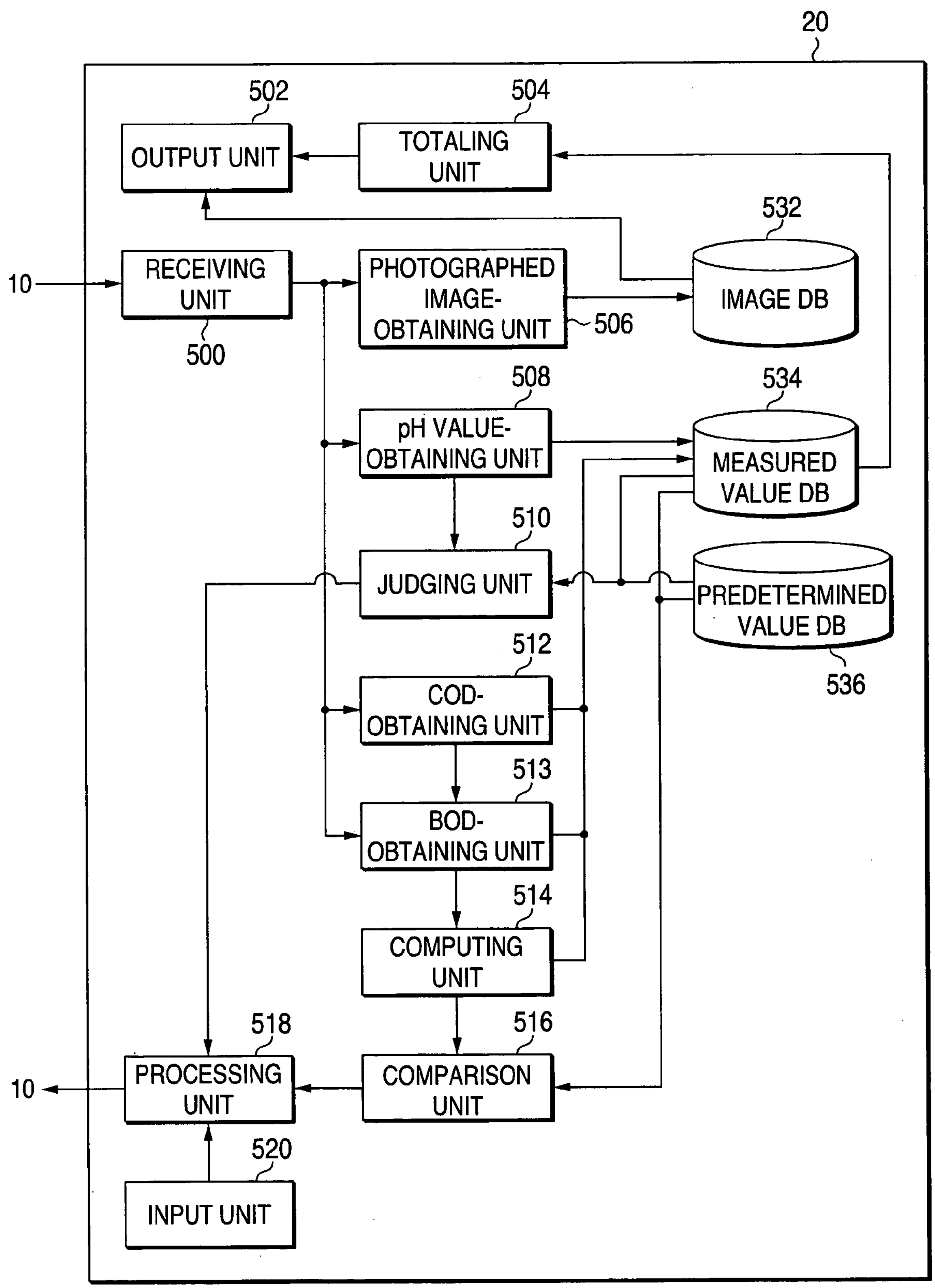
FIG. 6 is a block diagram showing the functional constitution of a central control device 20.

FIG. 6 is a block diagram showing the whole of the central control system embodying the invention. This central control system comprises a communication network 10, the central control device 20, the factory terminals 30 and treatment tanks 90. The factory terminals 30 are each placed in factories 40 physically apart from one another. The factory terminals 30 are each connected to the treatment tanks 90, obtain wastewater information such as the measured values of COD and BOD, and transmit it to the central control device 20.

The central control device system 20 receives the wastewater information from the factory terminals 30 through the communication network 10, and stores it in a database. Further, the central control system 20 transmits treatment information indicating treatment to be conducted by the factories 40 to the factory terminals 30, on the basis of the wastewater information received. The communication network 10 is a cable communication network, a wireless communication network or any combination thereof, and includes an internet, a PSTN (public switched telephone network), a LAN and a WAN.

FIG. 6 is a block diagram showing the functional constitution of the central control device 20. The central control device 20 has a receiving unit 500, an output unit 502, a totaling unit 504, a photographed image-obtaining unit 506, a pH value-obtaining unit 508, a judging unit 510, a COD-obtaining unit 512, a BOD-obtaining unit 513, a computing unit 514, a comparison unit 516, a processing unit 518, an input unit 520, an image data base 532, a measured value data base 534 and a predetermined value data base 536.

The image data base 532 stores image data of an image obtained by photographing a state of the treatment tank 90, in a state where the data is matched to microorganism ID identifying a microorganism. The microorganism ID specifies a microorganism or wastewater used in the factory, and is the type of microorganism, the lot of culture or information corresponding thereto. The measured value data base 534 stores COD and BOD values of the wastewater before treatment and COD and BOD values of the wastewater after treatment in a state where the values are matched to the microorganism ID and a factory number. The predetermined value data base 536 stores a COD predetermined value that is a value preliminarily determined with respect to a COD value, a BOD predetermined value that is a value preliminarily determined with respect to a BOD value, and a pH predetermined value that is a value preliminarily determined with respect to a pH value. As the pH predetermined value, a value within the range centered at a pH value suitable for a microorganism is stored.

The receiving unit 500 receives the factory number identifying the factory 40, the image data, the pH value, the BOD values and the COD values from the factory terminal 30 for each treatment tank. Here, the receiving unit 500 receives the COD and BOD values of the wastewater before treatment, and COD and BOD values of the wastewater after treatment as COD and BOD values. The receiving unit 500 transmits the image data and the factory number received to the photographed image-obtaining unit 506. Further, the receiving unit 500 transmits the pH value and the factory number received to the pH value-obtaining unit 508. Furthermore, the receiving unit 500 transmits the COD values, the BOD values and the factory number to the COD-obtaining unit 512 and the BOD-obtaining unit 513.

The photographed image-obtaining unit 506 stores the received image data in the image data base 532 in a state where the data is matched to the factory number. The pH value-obtaining unit 508 stores the received pH value in the measured value data base 534 in a state where the value is matched to the factory number. Further, the pH value-obtaining unit 508 transmits the received pH value and the factory number to the judging unit 510. The COD-obtaining unit 512 stores the received COD values in the measured value data base 534 in a state where the values are matched to the factory number. Further, the COD-obtaining unit 512 transmits the received COD values and the factory number to the computing unit 514. The BOD-obtaining unit 513 stores the received BOD values in the measured value data base 534 in a state where the values are matched to the factory number. Further, the BOD-obtaining unit 512 transmits the received BOD values and the factory number to the computing unit 514.

The judging unit 510 extracts the microorganism ID from the measured value data base 534, the microorganism ID being stored in a state where the ID is matched to the factory number received from the pH value-obtaining unit 508. The microorganism ID is one of microorganism-specifying information specifying a microorganism. Then, the judging unit 510 extracts the pH predetermined value from the predetermined value data base 536, the pH predetermined value being stored in a state where the value is matched to the microorganism ID. Then, the judging unit 510 judges whether the pH value received from the pH value-obtaining unit 508 is included in the pH predetermined value extracted from the predetermined value data base 536 or not. When the judging unit 510 judges that the pH value received from the pH value-obtaining unit 508 is not included in the pH predetermined value extracted from the predetermined value data base 536, the judging unit transmits the pH predetermined value, the pH value received from the pH value-obtaining unit 508 and the factory number to the processing unit 518.

The processing unit 518 calculates a pH difference by subtracting an intermediate value of the pH predetermined values received from the judging unit 510, from the pH value. The processing unit 518 transmits an instruction to add an acid to the treatment tank 90, when the pH difference calculated is a positive number, and an instruction to add an alkali to the treatment tank 90, when the pH difference calculated is a negative number, together with the pH difference, to the factory terminal 30 specified by the factory number.

The computing unit 514 receives the COD values and the factory number from the COD-obtaining unit 512, and the BOD values and the factory number from the BOD-obtaining unit 513. The computing unit 514 subtracts the COD value after treatment from the COD value before treatment to calculate a COD difference, and subtracts the BOD value after treatment from the BOD value before treatment to calculate a BOD difference. The computing unit 514 stores the calculated COD and BOD differences in the measured value data base 534 in a state where the differences are matched to the factory number. Further, the computing unit 514 transmits the calculated COD and BOD differences and the factory number to the comparison unit 516.

The comparison unit 516 extracts the microorganism ID from the measured value data base 534, the microorganism ID being stored in a state where the ID is matched to the factory number received. Then, the comparison unit 516 extracts the COD predetermined value and the BOD predetermined value stored in a state where the values are matched to the microorganism ID extracted. Then, the comparison unit 516 compares the extracted COD predetermined value and BOD predetermined value with the COD difference and BOD difference, respectively, which are received from the computing unit 514. When the COD difference is judged to be less than the COD predetermined value, the comparison unit 516 transmits less-than-predetermined-value information indicating that the COD difference is less than the COD predetermined value, together with the COD difference and the factory number, to the processing unit 518. Similarly, when the BOD difference is judged to be less than the BOD predetermined value, the comparison unit 516 transmits less-than-predetermined-value information indicating that the BOD difference is less than the BOD predetermined value, together with the BOD difference and the factory number, to the processing unit 518. The processing unit 518 transmits the received less-than-predetermined-value information, the COD difference and the BOD difference to the factory terminal 30 specified by the factory number.

The totaling unit 504 summarizes the measured values stored in the measured value data base 534 for each microorganism ID. Specifically, the totaling unit 504 extracts the COD difference and the BOD difference for each microorganism ID, and calculates each average value. Further, the totaling unit 504 may integrate the COD difference and the BOD difference for each microorganism ID. Furthermore, the totaling unit 504 may calculate the rate of change in each of the COD difference and the BOD difference. Thus, the totaling unit 504 totals the measured values stored in the measured value data base 534, and transmits results thereof to the output unit 502.

The output unit 502 outputs the results of totaling received from the totaling unit 504. Further, the output unit 502 extracts the image data from the image data base 532, and displays it. The operator of the central control device 20 inspects an image displayed. When an abnormality is discovered in the image displayed, the operator enters abnormality information indicating the abnormality and the factory number in the input unit 520. When the input unit 520 accepts the abnormality information, it transmits the factory number and the abnormality information to the processing unit 518. The processing unit 518 transmits the received abnormality information to the factory terminal 30 specified by the factory number.

FIG. 7 shows one example of a data format of the measured value data base 534. The measured value data base 534 has a table and a microorganism ID field for each factory number. The microorganism ID field stores the microorganism ID for identifying the microorganism used for wastewater treatment in the factory. The microorganism ID may be, for example, information indicating the type of microorganism or information indicating the lot of culture.

The table has a field of the date and time, a field of treatment tank 1 and a field of treatment tank 2. The field of the date and time stores information indicating the date and time. The fields of treatment tank 1 and treatment tank 2 each include a field before treatment, a field after treatment and a field of the difference. The field before treatment stores information indicating the COD concentration before the wastewater is treated with the microorganism in the treatment tank 90. The field after treatment stores information indicating the COD concentration after the wastewater is treated with the microorganism in the treatment tank 90. The field of the difference stores information indicating the COD difference obtained by subtracting the COD concentration after treatment from the COD concentration before treatment.

When the COD-obtaining unit 512 obtains the COD concentration before treatment and the COD concentration after treatment, it stores them in the measured value data base 534 in a state where they are matched to the date obtained. Further, the computing unit 514 stores the COD difference calculated in a state where the difference is matched to the date on which the COD concentrations have been obtained by the COD-obtaining unit 512. Here, the measured value data base 534 stores the microorganism ID for each factory number. However, instead of this, the microorganism ID may be stored for each treatment tank, as another example.

FIG. 8 shows one example of a data format of the measured value data base 534. The measured value data base 534 has a table of the COD value or the BOD value and a microorganism ID field for each factory number. The microorganism ID field stores the microorganism ID for identifying the microorganism used for wastewater treatment in the factory. The microorganism ID may be, for example, information indicating the type of microorganism or information indicating the lot of culture.

FIG. 8A shows an example of a data format for the COD value, and FIG. 8B shows an example of a data format for the BOD value. Each of the tables for the COD value and the BOD value has, a field of the date and time, a field of treatment tank 1 and a field of treatment tank 2. The example shown in FIG. 8 is used for a two-tank type treatment tank, so that the format has the fields of treatment tank 1 and treatment tank 2. For example, however, in the case of a one-tank type treatment tank, it goes without saying that the format has only the field of treatment tank 1. The field of the date and time stores information indicating the date and time. The fields of treatment tank 1 and treatment tank 2 each include a field before treatment, a field after treatment and a field of the difference. The field before treatment stores information indicating the COD and BOD values before the wastewater is treated with the microorganism in the treatment tank 90. The field after treatment stores information indicating the COD and BOD values after the wastewater is treated with the microorganism in the treatment tank 90. The field of the difference stores information indicating the COD difference and BOD difference each obtained by subtracting the COD value and BOD value after treatment from the COD value and BOD value before treatment, respectively.

Figure 9:
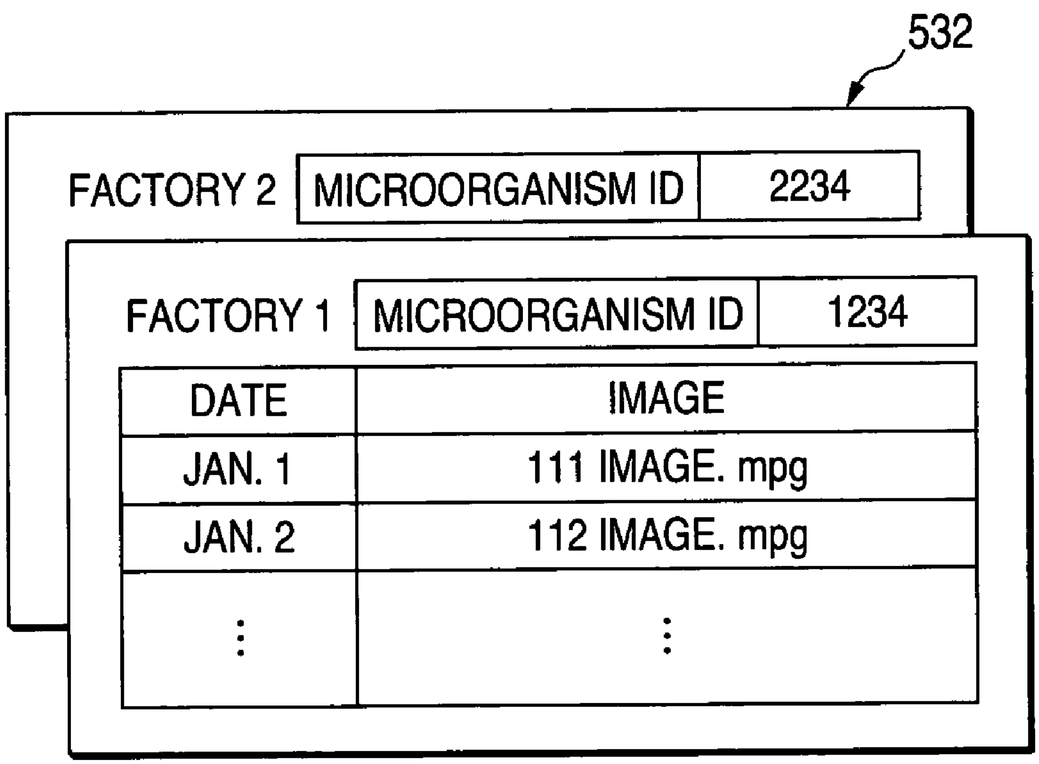
FIG. 9 shows one example of a data format of an image data base 532.

In this embodiment, the image data is also employed as one of information for control. FIG. 9 shows one example of a data format of the image data base 532. The image data base 532 has a table and a microorganism ID field for each factory number. The microorganism ID field stores the microorganism ID for identifying the microorganism used for wastewater treatment in the factory.

The table contains a field of the date and time and an image field. The field of the date and time stores information indicating the date and time. The image field stores the image data. Here, the image field may store either the image data itself or information identifying the image data. The term "image data" as used herein means image data showing a photographed image of the treatment tank 90, and data for monitoring that can diagnose the state of wastewater treatment such as the state of discoloration of the wastewater during treatment or the state of sludge. In the wastewater treatment control system of the invention, it is preferable to collect also the image data. Thus, the photographed image-obtaining unit (506 in FIG. 6) stores the image data in this image data base 532 in a state where the image data is matched to the date on which the image data is prepared.

FIG. 10 shows one example of a data format of the predetermined value data base 536. The predetermined value data base 536 contains a microorganism ID field, a tank field, a COD predetermined value field and a pH predetermined value field. The microorganism ID field stores the microorganism ID for identifying the microorganism. The tank field stores information identifying the tank. The COD predetermined value field stores information indicating the COD predetermined value. The pH predetermined value field stores information indicating the pH predetermined value.

FIG. 11 shows one example of a data format of the predetermined value data base 536. The predetermined value data base 536 contains a microorganism ID field, a tank field, a COD predetermined value field, a BOD predetermined value field and a pH predetermined value field. The microorganism ID field stores the microorganism ID for identifying the microorganism. The tank field stores information identifying the tank. The COD predetermined value field stores information indicating the COD predetermined value. The BOD predetermined value field stores information indicating the BOD predetermined value. The pH predetermined value field stores information indicating the pH predetermined value.

Figure 12:
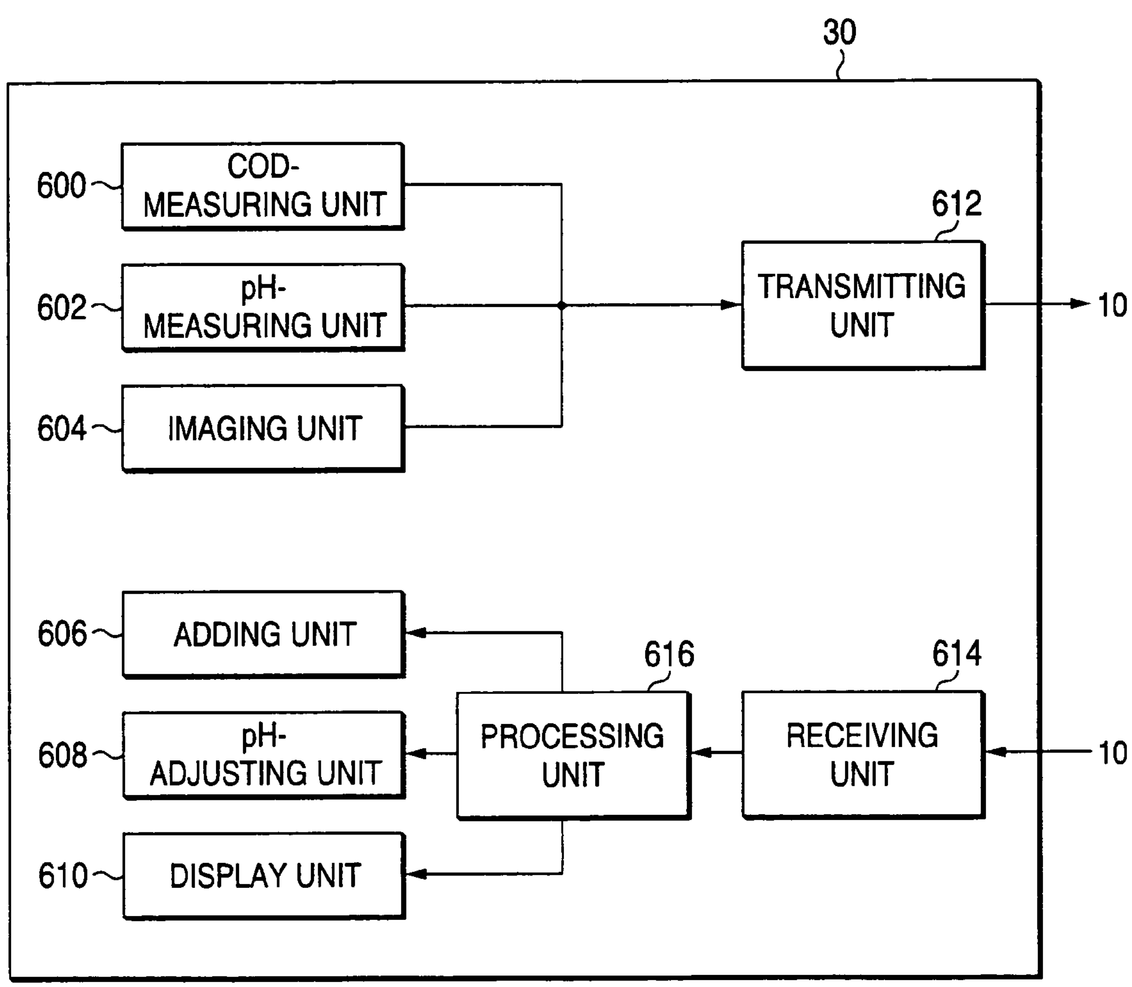
FIG. 12 is a block diagram showing the functional constitution of a factory terminal 30.

FIG. 12 is a block diagram showing the functional constitution of the factory terminal 30. The factory terminal 30 has a COD-measuring unit 600, a pH-measuring unit 602, an imaging unit 604, an adding unit 606, a pH-adjusting unit 608, a display unit 610, a transmitting unit 612, a receiving unit 614, and a processing unit 616.

The COD-measuring unit 600 measures the COD concentration of the wastewater before treatment and the COD concentration of the wastewater after treatment, and transmits the measured COD concentrations to the transmitting unit 612. The pH-measuring unit 602 measures the pH of a solution in the treatment tank 90 for treating the wastewater, and transmits the measured pH value to the transmitting unit 612. The imaging unit 604 photographs a state in the treatment tank 90, and transmits the photographed image data to the transmitting unit 612.

The transmitting unit 612 transmits the COD concentrations received from the COD-measuring unit 600, the pH value received from the pH-measuring unit 602 and the image data received from the imaging unit 604 to the central control device 20 in a state where they are matched to the factory number identifying the factory terminal 30.

The receiving unit 614 receives the instruction to add an acid to the treatment tank 90 and the pH difference, the instruction to add an alkali to the treatment tank 90 and the pH difference, less-than-predetermined-value information and information indicating the COD difference or abnormality information from the central control device 20. Then, the receiving unit 614 transmits the received information to the processing unit 616.

When the processing unit 616 receives the instruction to add an acid to the treatment tank 90 and the pH difference, the processing unit calculates the amount of the acid to be added to the treatment tank 90, on the basis of the pH difference received. The processing unit 616 transmits quantitative information indicating the amount of the acid calculated to the pH-adjusting unit 608. The pH-adjusting unit 608 adds the acid to the treatment tank 90 in an amount specified by the quantitative information received.

When the processing unit 616 receives the instruction to add an alkali to the treatment tank 90 and the pH difference, the processing unit calculates the amount of the alkali to be added to the treatment tank 90, on the basis of the pH difference received. The processing unit 616 transmits quantitative information indicating the amount of the alkali calculated to the pH-adjusting unit 608. The pH-adjusting unit 608 adds the alkali to the treatment tank 90 in an amount specified by the quantitative information received.

When the processing unit 616 receives the instruction to add an acid to the treatment tank 90 and the pH difference, the processing unit 616 calculates the amount of the acid to be added to the treatment tank 90, on the basis of the pH difference received. The processing unit 616 transmits quantitative information indicating the amount of the acid calculated to the pH-adjusting unit 608. The pH-adjusting unit 608 adds the acid to the treatment tank 90 in an amount specified by the quantitative information received.

The processing unit 616 transmits the abnormality information received from the receiving unit 614 to the display unit 610. The display unit 610 displays that an abnormality occurred in the treatment tank, on receiving the abnormality information.

Figure 13:
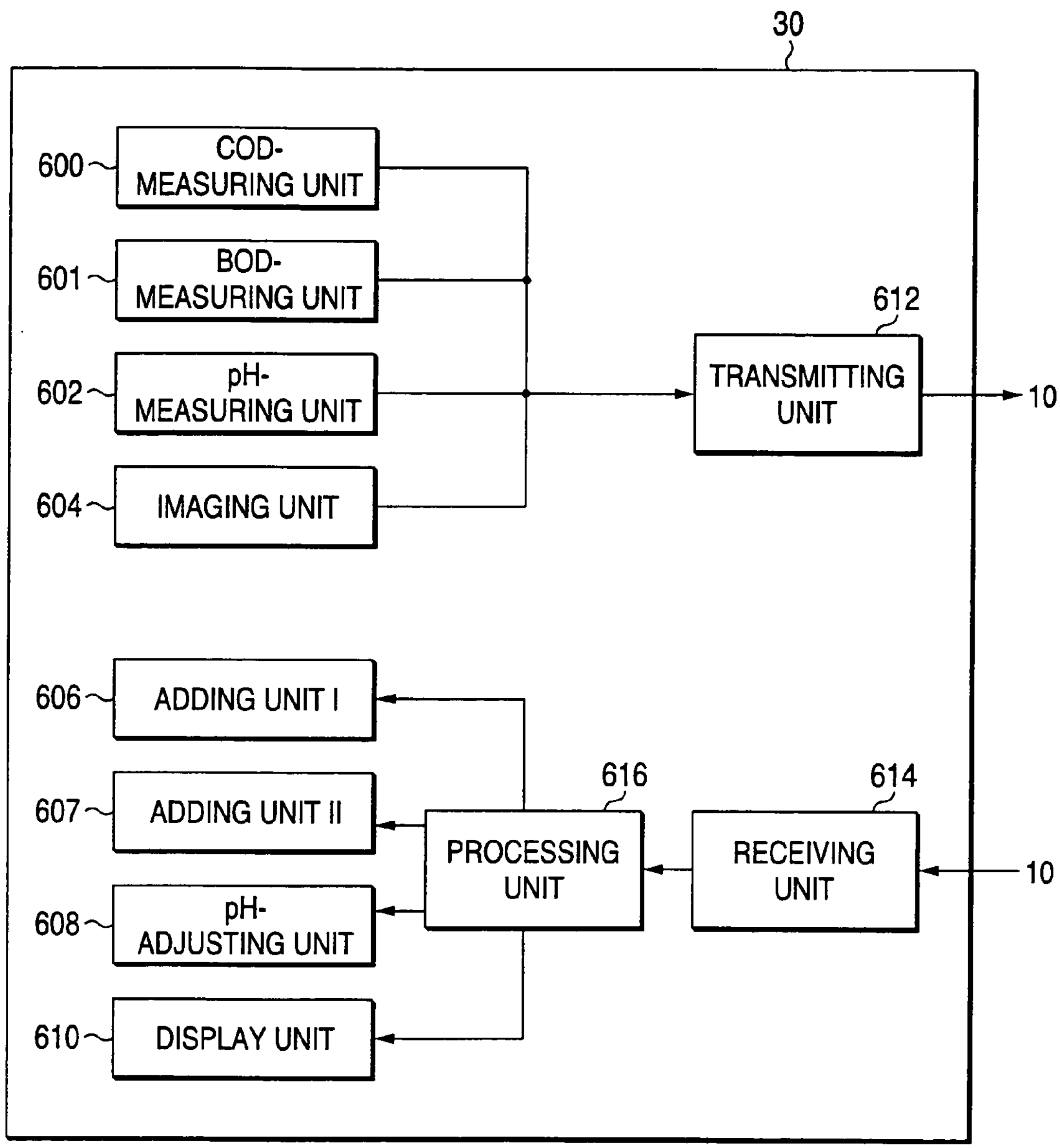
FIG. 13 is a block diagram showing the functional constitution of a factory terminal 30.

FIG. 13 is a block diagram showing the functional constitution of the factory terminal 30. The factory terminal 30 has a COD-measuring unit 600, a BOD-measuring unit 601, a pH-measuring unit 602, an imaging unit 604, an adding unit I 606 for conducting addition for COD correction, an adding unit II 607 for conducting addition for BOD correction, a pH-adjusting unit 608, a display unit 610, a transmitting unit 612, a receiving unit 614, and a processing unit 616.

The COD-measuring unit 600 measures the COD value of the wastewater before treatment and the COD value of the wastewater after treatment, and transmits the measured COD values to the transmitting unit 612.

The BOD-measuring unit 601 measures the BOD value of the wastewater before treatment and the BOD value of the wastewater after treatment, and transmits the measured BOD values to the transmitting unit 612.

The pH-measuring unit 602 measures the pH of a solution in the treatment tank 90 for treating the wastewater, and transmits the measured pH value to the transmitting unit 612. The imaging unit 604 photographs a state in the treatment tank 90, and transmits the photographed image data to the transmitting unit 612.

The transmitting unit 612 transmits the COD values received from the COD-measuring unit 600, the BOD values received from the BOD-measuring unit 601, the pH value received from the pH-measuring unit 602 and the image data received from the imaging unit 604 to the central control device 20 in a state where they are matched to the factory number identifying the factory terminal 30.

The receiving unit 614 receives the instruction to add an acid or an alkali to the treatment tank 90 and the pH difference, each less-than-predetermined-value information for the COD value and the BOD value, and information indicating each difference thereof, or abnormality information from the central control device 20. Then, the receiving unit 614 transmits the received information to the processing unit 616.

When the processing unit 616 receives the instruction to add an acid to the treatment tank 90 and the pH difference, the processing unit calculates the amount of the acid to be added to the treatment tank 90, on the basis of the pH difference received. The processing unit 616 transmits quantitative information indicating the amount of the acid calculated to the pH-adjusting unit 608. The pH-adjusting unit 608 adds the acid to the treatment tank 90 in an amount specified by the quantitative information received.

When the processing unit 616 receives the instruction to add an alkali to the treatment tank 90 and the pH difference, the processing unit calculates the amount of the alkali to be added to the treatment tank 90, on the basis of the pH difference received. The processing unit 616 transmits quantitative information indicating the amount of the alkali calculated to the pH-adjusting unit 608. The pH-adjusting unit 608 adds the alkali to the treatment tank 90 in an amount specified by the quantitative information received.

When the processing unit 616 receives the less-than-predetermined-value information for the COD value and information indicating the COD difference from the receiving unit 614, the processing unit calculates the amount of the nutrient source for the specific microorganism to be added to the treatment tank 90, on the basis of the COD difference. The processing unit 616 transmits nutrient source quantitative information indicating the amount of the nutrient source calculated to the adding unit I 606 for adding the nutrient source for the specific microorganism. The adding unit I 606 adds the nutrient source to the treatment tank 90 in an amount specified by the nutrient source quantitative information received from the processing unit 616.

When the processing 616 receives the less-than-predetermined-value information for the BOD value and information indicating the BOD difference from the receiving unit 614, the processing unit calculates the amount of the nutrient source for a biodegrading bacterium (microorganism in sludge) to be added to the treatment tank 90, on the basis of the BOD difference. The processing unit 616 transmits nutrient source quantitative information indicating the amount of the nutrient source calculated to the adding unit II 607 for adding the nutrient source for the biodegrading bacterium. The adding unit II 607 adds the nutrient source to the treatment tank 90 in an amount specified by the nutrient source quantitative information received from the processing unit 616.

The processing unit 616 transmits the abnormality information received from the receiving unit 614 to the display unit 610. The display unit 610 displays that an abnormality occurred in the treatment tank, on receiving the abnormality information.

Figure 14:
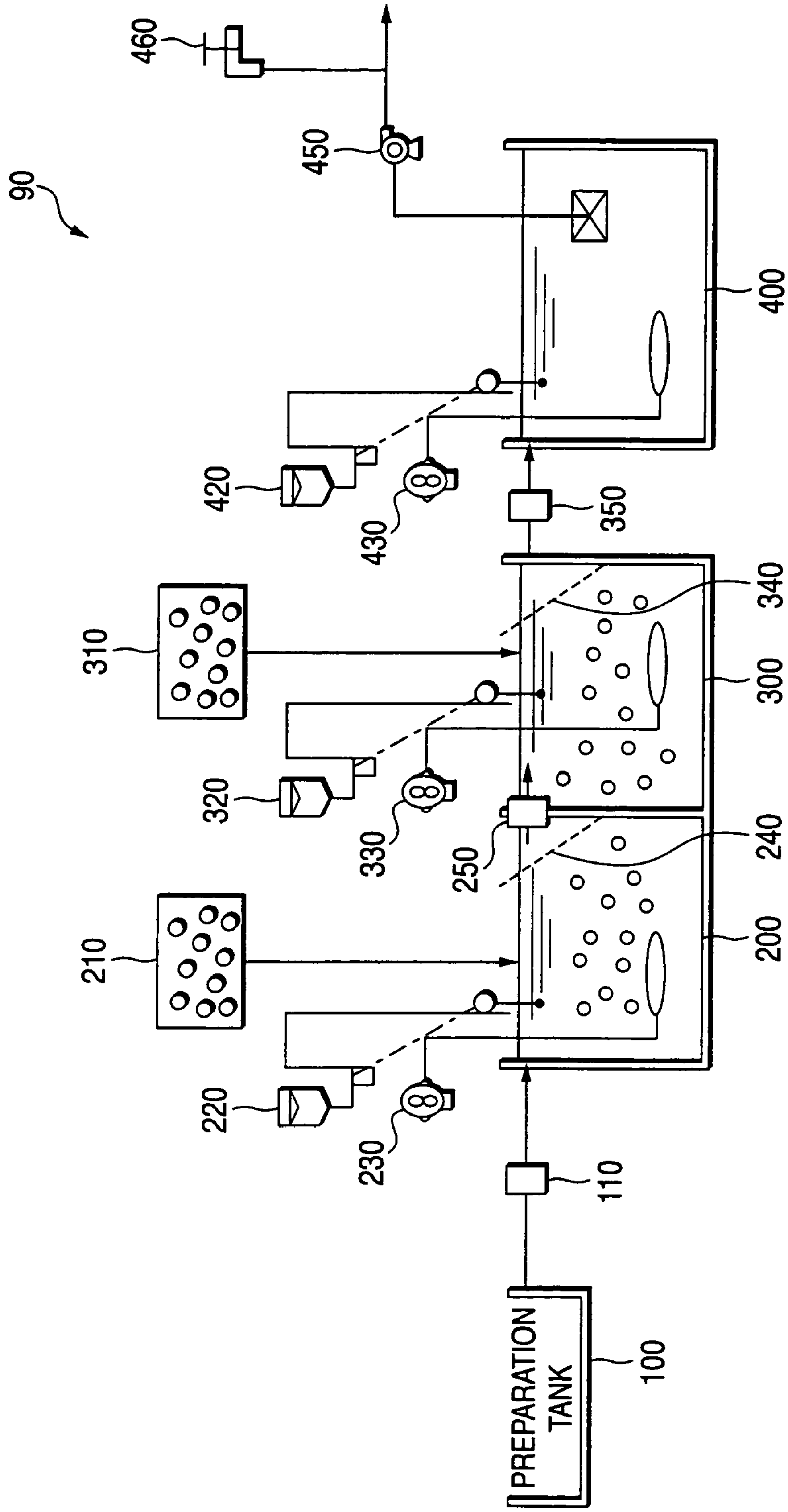
FIG. 14 is a schematic view showing a treatment tank connected to the factory terminal 30.

FIG. 14 is a schematic view showing the treatment tank 90 connected to the factory terminal 30. In this embodiment, an explanation is given using the treatment tank in which two tanks are arranged in series, as one example. The treatment tank 90 comprises a control tank 100, a first COD-measuring unit 110, a first treatment tank 200, a second COD-measuring unit 250, a second treatment tank 300, a third COD-measuring unit 350, a sludge tank 400 and a diluting unit 460.

The first COD-measuring unit 110, the second COD-measuring unit 250 and the third COD-measuring unit 350 shown in FIG. 14 realize the function of the COD-measuring unit 600 shown in FIG. 12. Further, a pH-adjusting unit 220 and a pH-adjusting unit 320 shown in FIG. 14 realize the function of the pH-adjusting unit 608 shown in FIG. 12. Furthermore, an adding unit 210 and an adding unit 310 shown in FIG. 14 realize the function of the adding unit 606 shown in FIG. 12.

The control tank 100 controls the wastewater, and transfers it to the first treatment tank 200. For example, the control tank 100 controls the flow rate, pH and temperature of the wastewater so that they are suitable for the microorganism contained in the first treatment tank 200.

The volume of the first treatment tank 200 and second treatment tank 300 varies depending on the amount of wastewater. For example, the volume of the first treatment tank 200 and second treatment tank 300 is adjusted so that the total residence time of the wastewater in the first treatment tank 200 and second treatment tank 300 comes to about 0.2 day to about 20 days. In particular, the volume of the first treatment tank 200 and second treatment tank 300 is preferably adjusted so that the total residence time of the wastewater in the first treatment tank 200 and second treatment tank 300 comes to about 0.5 day to about 5 days. The wastewater is stayed in the first treatment tank 200 for a predetermined period of time, and then, transferred to the second treatment tank 300. After further staying in the second treatment tank for a predetermined period of time, the wastewater is transferred to the sludge tank 400.

The specific microorganism is added to both the first treatment tank 200 and second treatment tank 300, or at least the second treatment tank 300. The microorganism added degrades the hardly biodegradable material contained in the wastewater. The hardly biodegradable material is, for example, an organic aminocarboxylic acid such as EDTA (ethylenediaminetetraacetic acid), DTPA (diethylenetriaminepentaacetic acid) or PDTA (1,3-propanediaminetetraacetic acid). Above all, EDTA is particularly effective.

Further, the microorganism contained in the first treatment tank 200 is previously naturalized to wastewater having a higher concentration than the microorganism contained in the second treatment tank 300. For example, the first treatment tank 200 contains the microorganism naturalized to wastewater having a COD concentration of 0.5 g/l to 20 g/l. On the other hand, the second treatment tank 300 contains the microorganism naturalized to wastewater having a COD concentration of 0.3 g/l to 14 g/l. In this embodiment, the microorganism contained in the first treatment tank 200 is one naturalized by statically cultivating *Bacillus editabidus*-1 in a culture (pH 6.0) comprising 0.5% polypeptone, 0.1% yeast extract, 0.1% Cu-EDTA and 500 ml of 1/30 M phosphate buffer, at 37° C. for 7 days. The microorganism contained in the second treatment tank 300 is one naturalized by statically cultivating *Bacillus editabidus*-1 in a culture (pH 6.0) comprising 0.5% polypeptone, 0.1% yeast extract, 0.01% Cu-EDTA and 500 ml of 1/30 M phosphate buffer, at 37° C. for 7 days.

The first COD-measuring unit 110 measures the COD concentration of the wastewater before the wastewater is transferred from the control tank 100 to the first treatment tank 200. The first COD-measuring unit 110 is installed, for example, in the vicinity of a wastewater inlet of the first treatment tank 200. Further, the first COD-measuring unit 110 maybe installed in the control tank 100, as long as it is arranged in such a position that it can measure the COD concentration of the wastewater before addition of the microorganism.

The second COD-measuring unit 250 measures the COD concentration of the wastewater just before the wastewater is transferred from the first treatment tank 200 to the second treatment tank 300. The second COD-measuring unit 250 is installed, for example, in the vicinity of a wastewater inlet of the second treatment tank 300. Further, the second COD-measuring unit 250 may be installed in the first treatment tank 200 or the second treatment tank 300, as long as it is arranged in such a position that it can measure the COD concentration of the wastewater just before or just after the transfer of the wastewater from the first treatment 200 to the second treatment tank 300.

The third COD-measuring unit 350 measures the COD concentration of the wastewater when the wastewater is transferred from the second treatment tank 200 to the sludge tank 400. The third COD-measuring unit 350 is installed in the vicinity of a wastewater outlet of the second treatment tank 300. Further, the third COD-measuring unit 350 may be installed in the second treatment tank 300 or in the sludge tank 400, as long as it is arranged in such a position that it can measure the COD concentration of the wastewater after treatment in the second treatment tank 300.

The first treatment tank 200 further has the adding unit 210, the pH-adjusting unit 220, a stirring unit 230 and a filter 240. The pH-adjusting unit 220 measures the pH of the wastewater in the first treatment tank 200, and adjusts the pH to a preliminarily established value. Here, the pH-adjusting unit 220 adjusts the pH to a value suitable for the microorganism added to the first treatment tank 200. For example, the pH-adjusting unit 220 adjusts the pH of the wastewater in the first treatment tank 200 to about 6.0. The stirring unit 230 stirs the wastewater in the first treatment tank 200. The stirring unit 230 may be a unit that mechanically stirs the wastewater. In this embodiment, the stirring unit 230 stirs the wastewater by aeration. The filter 240 separates the wastewater from the carrier on which the microorganism is immobilized.

The adding unit 210 adds the nutriment for the microorganism to the first treatment tank 200, when degradability of the microorganism is lowered. Specifically, when the factory terminal 30 receives the less-than-predetermined-value information from the central control device 20, the adding unit 210 adds the nutriment suitable for growth of the microorganism such as a carbon source, a nitrogen source, an organic nutrient source or nutriment source comprising an inorganic salt to the first treatment tank 200. As the organic nutrient sources, there can be added, for example, polypeptones, yeast extract, meat extract and molasses. Further, as the inorganic nutrient sources, there can be added, for example, various types of phosphates and magnesium salts. In this case, the adding unit 210 adds the nutriment to the first treatment tank 200 in an amount corresponding to the COD difference received from the central control device 20 by the factory terminal 30.

Further, when the adding unit 210 receives the less-than-predetermined-value information from the central control device 20 after addition of the nutriment for the microorganism, the adding unit adds the microorganism itself that degrades the hardly degradable material contained in the wastewater to the first treatment tank 200. In this case, the adding unit 210 adds the microorganism to the first treatment tank 200, in an amount corresponding to the COD difference received from the central control device 20 by the factory terminal 30.

In this case, the adding unit 210 adds the microorganism to the first treatment tank 200, in an amount of 10 g to 50 kg by dry weight per cubic meter of wastewater. More preferably, the adding unit 210 adds the microorganism to the first treatment tank 200, in an amount of 20 g to 5,000 g by dry weight per cubic meter of wastewater.

The second treatment tank 300 has the adding unit 310, the pH-adjusting unit 320, a stirring unit 330 and a filter 340. The adding unit 310 adds the nutriment for the microorganism to the second treatment tank 300, when degradability of the microorganism in the second treatment tank 300 is lowered. Specifically, when the difference between a COD concentration measured by the second COD-measuring unit 250 and a COD concentration measured by the third COD-measuring unit 350 is lower than a preliminarily determined value, the adding unit 310 adds the nutriment suitable for growth of the microorganism, such as a carbon source, a nitrogen source, an organic nutrient source or a nutrient source comprising an inorganic salt to the second treatment tank 300.

Further, even after addition of the nutriment for the microorganism, when the difference between a COD value measured by the second COD-measuring unit 250 and a COD value measured by the third COD-measuring unit 350 is lower than a preliminarily determined value, the adding unit 310 adds the microorganism itself that degrades organic aminocarboxylic acids contained in the wastewater to the second treatment tank 300.

The constitution and operation of the pH-adjusting unit 320, the stirring unit 330 and the filter 340 are approximately similar to those of the pH-adjusting unit 220, the stirring unit 230 and the filter 240, so that descriptions thereof are omitted.

The sludge tank 400 stores sludge contained in the second treatment tank 300, and discharges a supernatant of the wastewater to the outside. Further, the sludge tank 400 may complement the degradation treatment in the first treatment tank 200 and the second treatment tank 300. That is to say, the sludge tank 460 may degrade and remove organic materials and inorganic materials that can not be treated in the first treatment tank 200 and the second treatment tank 300.

The sludge tank 400 has a control unit 420, an aerating unit 430 and a drain pump 450. The control unit 420 infuses a neutralizing agent for neutralizing the wastewater and a nutritional supplement for the microorganism contained in the sludge tank 400 into the sludge tank 400. The aerating unit 430 conducts aeration. The drain pump 450 discharges the supernatant of the wastewater in the sludge tank 400 to the outside. The drain pump 450 may have a drain inspection unit. The drain inspection unit inspects the content of inclusions of a liquid discharged by the drain pump 450. A diluting unit 460 dilutes the wastewater discharged by the drain pump 450 with dilution water.

The treatment tank 90 according to this embodiment has two tanks, the first treatment tank 200 and the second treatment tank 300, but may be one tank. Further, it may have more tanks. Furthermore, in this embodiment, the factory terminal 30 calculates the amount of the nutriment added or the amount of the microorganism added, on the basis of the COD difference. However, any one of the addition of the nutriment, the amount of the sludge returned and the addition of the microorganism may be selected on the basis of the COD difference. Instead of the factory terminal 30, the central control device 20 may calculate the amount of the nutriment or microorganism added on the basis of the COD difference.

Figure 15:
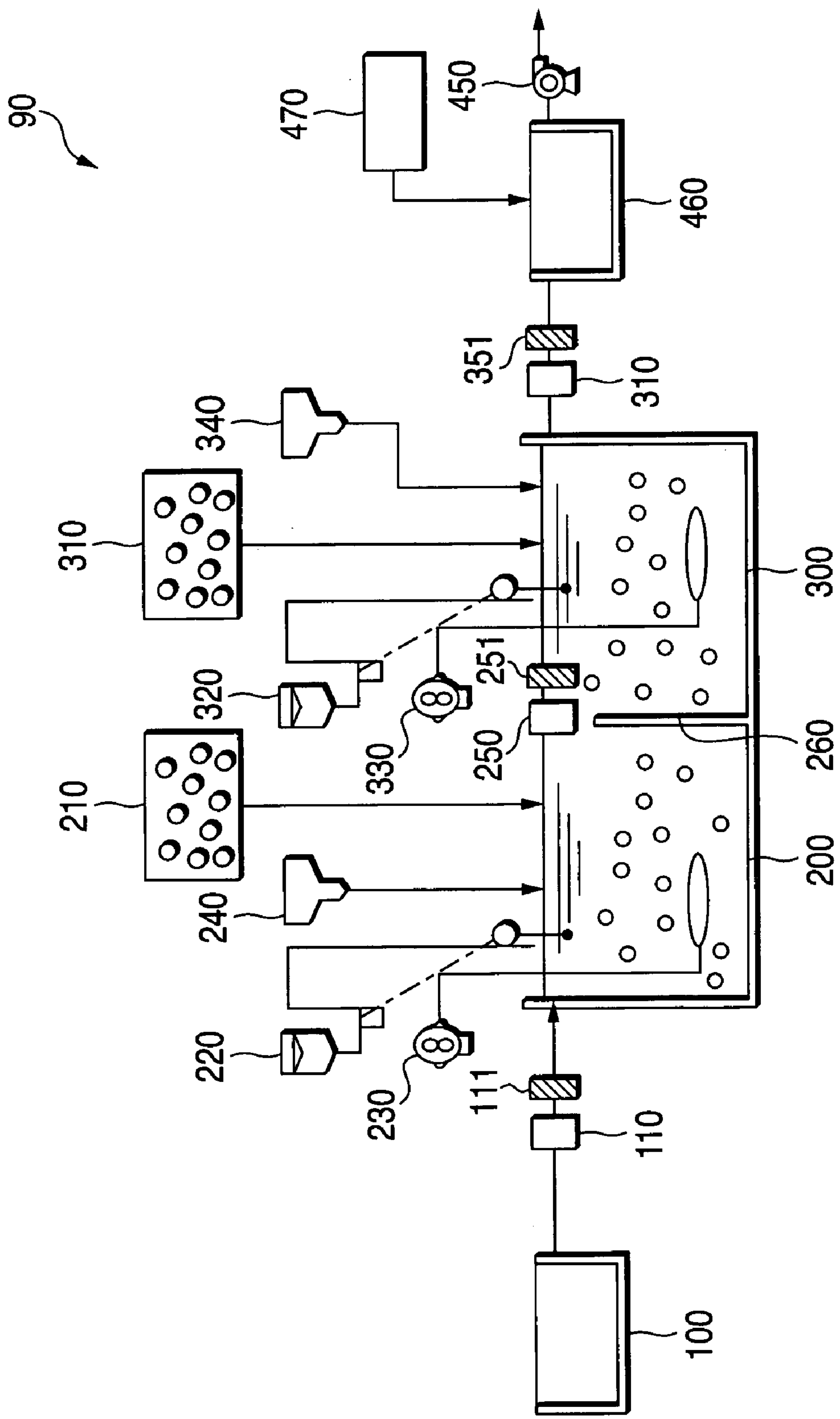
FIG. 15 is a schematic view showing a treatment tank connected to the factory terminal 30.

FIG. 15 is a schematic view showing the treatment tank 90 connected to the factory terminal 30. In this embodiment of the treatment tank 90, a single tank is used. However, a partition is provided in the tank to divide the tank into two sections, and the tank is composed of a first section and a second section connected in series to each other. The treatment tank 90 comprises a control tank 100, a first COD-measuring unit 110, a first BOD-measuring unit 111, a beginning part (referred to as a first section) 200 of an activated sludge tank, a second COD-measuring unit 250, a second BOD-measuring unit 251, a latter part (referred to as a second section) 300 of the activated sludge tank, a third COD-measuring unit 350, a third BOD-measuring unit 351, a treated wastewater control tank 460, a sludge tank 400 not shown in the figure and a diluting unit 470.

The first COD-measuring unit 110, the second COD-measuring unit 250 and the third COD-measuring unit 350 shown in FIG. 15 realize the function of the COD-measuring unit 600 shown in FIG. 13, and the first BOD-measuring unit 111, the second BOD-measuring unit 251 and the third BOD-measuring unit 351 shown in FIG. 15 realize the function of the BOD-measuring unit 601 shown in FIG. 13. Further, a pH-adjusting unit 220 and a pH-adjusting unit 320 shown in FIG. 15 realize the function of the pH-adjusting unit 608 shown in FIG. 13. Furthermore, an adding unit 210 and an adding unit 310 shown in FIG. 15, each of which conducts addition for both or at least one of COD correction and BOD correction, realize the functions of the adding unit I 606 for conducting addition for COD correction and the adding unit II 607 for conducting addition for BOD correction shown in FIG. 13.

The control tank 100 controls the wastewater, and transfers it to the first section 200 of the treatment tank. For example, the control tank 100 controls the flow rate, pH and temperature of the wastewater so that they are suitable for the microorganism contained in the first section 200 of the treatment tank.

The volume of the first section 206 and second section 300 of the treatment tank varies depending on the amount of wastewater. For example, the volume of the first section 200 and second section 300 of the treatment tank is adjusted so that the total residence time of the wastewater in the first section 200 and second section 300 of the treatment tank comes to about 0.2 day to about 20 days. In particular, the volume of the first section 200 and second section 300 of the treatment tank is preferably adjusted so that the total residence time of the wastewater in the first section 200 and second section 300 of the treatment tank comes to about 0.5 day to about 5 days. The wastewater is stayed in the first section 200 of the tank for a predetermined period of time, and then, transferred to the second section 300 of the treatment tank. After further staying in the second section for a predetermined period of time, the wastewater is transferred to the sludge tank 400.

The specific microorganism is added to both the first section 200 and second section 300 of the treatment tank, or at least the second section 300 of the treatment tank. The microorganism added degrades the hardly biodegradable material contained in the wastewater. The hardly biodegradable material is, for example, an organic aminocarboxylic acid such as EDTA (ethylenediaminetetraacetic acid), DTPA (diethylenetriaminepentaacetic acid) or PDTA (1,3-propanediaminetetraacetic acid) Above all, EDTA is particularly effective.

In this embodiment, the specific microorganism is a microorganism naturalized by statically cultivating *Bacillus editabidus*-1 in a culture (pH 6.0) comprising 0.5% polypeptone, 0.1% yeast extract, 0.1% Cu-EDTA and 500 ml of 1/30 M phosphate buffer, at 37° C. for 7 days.

The first COD-measuring unit 110 and the first BOD-measuring unit 111 measure the COD value and the BOD value of the wastewater before the wastewater is transferred from the control tank 100 to the first section 200 of the treatment tank. The first COD-measuring unit 110 and the first BOD-measuring unit 111 are installed, for example, in the vicinity of a wastewater inlet of the first section 200. Further, the first COD-measuring unit 110 and the first BOD-measuring unit 111 may be installed in the control tank 100, as long as they are arranged in such a position that they can measure the COD and BOD values of the wastewater before addition of the microorganism.

The second COD-measuring unit 250 and the second BOD-measuring unit 251 measure the COD value and the BOD value of the wastewater just before the wastewater is transferred from the first section 200 of the treatment tank to the second section 300 of the treatment tank. The second COD-measuring unit 250 and the second BOD-measuring unit 251 are installed, for example, in the vicinity of a wastewater inlet of the second section 300. Further, the second COD-measuring unit 250 and the second BOD-measuring unit 251 may be installed in an end portion of the first section 200, as long as they are arranged in such a position that they can measure the COD and BOD values of the wastewater just before, during or just after the transfer of the wastewater from the first section 200 to the second section 300.

The third COD-measuring unit 350 and the third BOD-measuring unit 351 measure the COD value and the BOD value of the wastewater when the wastewater is transferred from the second section 200 to the wastewater control tank 460. The third COD-measuring unit 350 and the third BOD-measuring unit 351 are installed in the vicinity of a wastewater outlet of the second section 300. Further, the third COD-measuring unit 350 and the third BOD-measuring unit 351 may be installed in an outlet of the second section 300 or in the wastewater control tank 460, as long as they are arranged in such a position that they can measure the COD and BOD values of the wastewater after treatment in the second section 300.

The first section 200 of the treatment tank further has the adding unit 210, the pH-adjusting unit 220, a stirring unit 230 and a filter 240. The pH-adjusting unit 220 measures the pH of the wastewater in the first section 200, and adjusts the pH to a preliminarily established value. Here, the pH-adjusting unit 220 adjusts the pH to a value suitable for the microorganism added to the first section 200. For example, the pH-adjusting unit 220 adjusts the pH of the wastewater in the first section 200 to about 6.0. The stirring unit 230 stirs the wastewater in the first section 200. The stirring unit 230 may be a unit that mechanically stirs the wastewater. In this embodiment, the stirring unit 230 stirs the wastewater by aeration. The filter 240 separates the wastewater from the carrier on which the microorganism is immobilized.

The adding unit 210 adds activated sludge and/or the nutrient source for the specific microorganism to the first section 200 of the treatment tank, when degradability of the activated sludge or the specific microorganism is lowered. Specifically, when the factory terminal 30 receives the less-than-predetermined-value information from the central control device 20, the adding unit 210 adds the nutrient source suitable for growth of the specific microorganism such as a carbon source, a nitrogen source, an organic nutrient source or a nutrient source comprising an inorganic salt to the first section 200. As the organic nutrient sources, there can be added, for example, polypeptones, yeast extract, meat extract and molasses. Further, as the inorganic nutrient sources, there can be added, for example, various types of phosphates and magnesium salts. In this case, the adding unit 210 adds the nutrient source to the first section 200 in an amount corresponding to the COD difference received from the central control device 20 by the factory terminal 30.

Further, when the adding unit 210 receives the less-than-predetermined-value information from the central control device 20 after addition of the nutrient source for the biodegrading bacterium and/or the nutrient source for the specific microorganism, the adding unit increases the amount of returned sludge or adds the specific microorganism itself to the first section 200. In this case, the adding unit 210 increases the amount of returned sludge or adds the specific microorganism to the first section 200, in an amount corresponding to the COD difference or the BOD difference received from the central control device 20 by the factory terminal 30.

In this case, the adding unit 210 adds the returned sludge or the specific microorganism to the first section 200, in an amount of 10 g to 50 kg by dry weight per cubic meter of wastewater. More preferably, the adding unit 210 adds the returned sludge or the specific microorganism to the first section 200, in an amount of 20 g to 5,000 g by dry weight per cubic meter of wastewater.

The second section 300 of the treatment tank has the adding unit 310, the pH-adjusting unit 320, a stirring unit 330 and a filter 340. The adding unit 310 adds the nutrient source for the microorganism to the second section 300, when degradability of the activated sludge or the specific microorganism in the second section 300 is lowered. Specifically, when the difference between a COD concentration measured by the second COD-measuring unit 250 and a COD concentration measured by the third COD-measuring unit 350 is lower than a preliminarily determined value, the adding unit 310 adds the nutrient source suitable for growth of the microorganism, such as a carbon source, a nitrogen source, an organic nutrient source or a nutrient source comprising an inorganic salt to the second section 300 (the adding unit I 606 in FIG. 13). Also in the section 300, the BOD-measuring unit 251 measures the BOD value, and when biodegradability is lowered, the nutrient source for the activated sludge can be supplied in the same manner as in the first section (the adding unit II 607 in FIG. 13). However, generally, with respect to the biodegradability, it is preferable to cope with by the addition of the nutrient source described above and further the increase in the amount of the returned sludge.

Further, even after addition of the nutrient source for the microorganism, when the difference between a COD value measured by the second COD-measuring unit 250 and a COD value measured by the third COD-measuring unit 350 is lower than a preliminarily determined value, the adding unit 310 adds the specific microorganism itself that degrades organic aminocarboxylic acids contained in the wastewater to the second section 300.

In addition, with respect to the BOD, it is preferable to cope with in the first section as described above. However, when the difference between a BOD value measured by the second BOD-measuring unit 251 and a BOD value measured by the third BOD-measuring unit 351 is lower than a preliminarily determined value, the returned sludge may be added to the second section 300 to increase the amount of the biodegrading bacterium in the second section of the activated sludge tank.

The constitution and operation of the pH-adjusting unit 320, the stirring unit 330 and the filter 340 are approximately similar to those of the pH-adjusting unit 220, the stirring unit 230 and the filter 240, so that descriptions thereof are omitted.

The wastewater control tank 460 stores sludge contained in the second section 300, and discharges a supernatant of the wastewater to the outside. Further, the wastewater control tank 460 may complement the degradation treatment in the first section 200 and the second section 300. That is to say, the wastewater control tank 460 may degrade and remove organic materials and inorganic materials that can not be treated in the first section 200 and the second section 300.

The wastewater control tank 460 has a control unit (not shown in the figure), an aerating unit (not shown in the figure) and a drain pump 450. The control unit infuses a neutralizing agent for neutralizing the wastewater and a nutritional supplement for the microorganism contained in the wastewater control tank 460 into the wastewater control tank 460. The aerating unit conducts aeration. The drain pump 450 discharges the supernatant of the wastewater in the wastewater control tank 460 to the outside. The drain pump 450 may have a drain inspection unit. The drain inspection unit inspects the content of inclusions of a liquid discharged by the drain pump 450. The wastewater control tank 460 dilutes the wastewater discharged by the drain pump 450 with dilution water.

The treatment tank 90 according to this embodiment is the single tank comprising two sections, the first section 200 and the second section 300, but may be one tank having no partition. It may have two tanks in series or more tanks. Further, in this embodiment, the factory terminal 30 calculates the amount of the nutrient source added, the amount of the sludge returned or the amount of the specific microorganism added, on the basis of the COD difference and the BOD difference. However, any one of the addition of the nutrient source, the amount of the sludge returned and the addition of the specific microorganism may be selected on the basis of the COD difference and the BOD difference. Instead of the factory terminal 30, the central control device 20 may calculate the amount of the nutrient source or microorganism added on the basis of the COD difference and/or the BOD difference.

Figure 16:
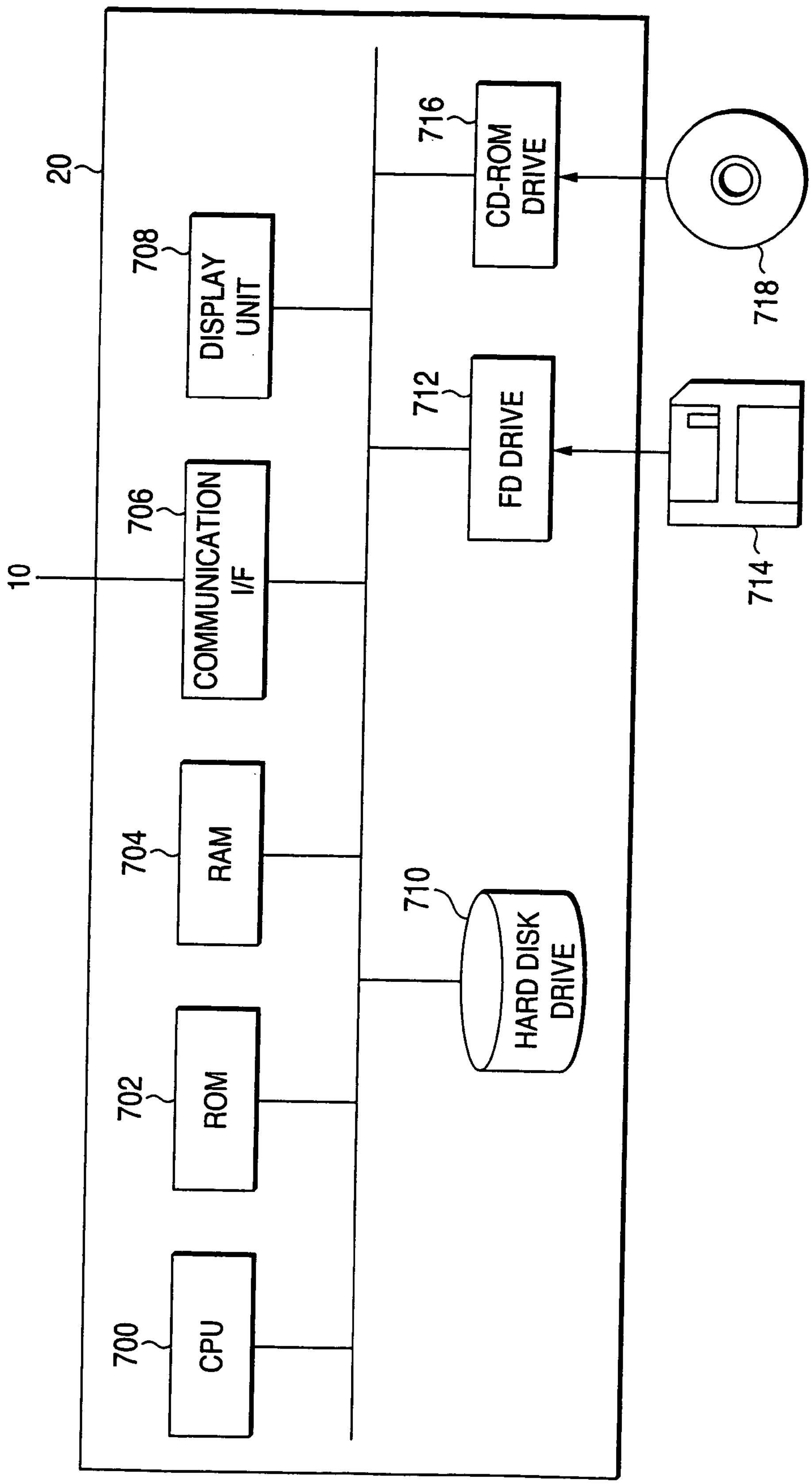
FIG. 16 is a block diagram showing the hardware constitution of the central control device 20.

FIG. 16 is a block diagram showing the hardware constitution of the central control device 20. The central control device 20 has a CPU 700, a ROM 702, a RAM 704, a communication interface 706, a display unit 708 as an example of the output unit 502, a hard disk drive 710, a floppy disk drive 712, a floppy disk 714, a CD-ROM drive 716 and a CD-ROM 718. The CPU 700 operates on the basis of programs stored in the ROM 702 and the RAM 704. The communication interface 706 communicates with the factory terminal 30 through the network 10. The hard disk drive 710 as an example of a storing device stores setting information and a program by which the CPU 700 operates. Further, the communication interface 706 may communicates with the factory terminal 30 through an exclusive line. The hard disk drive 710 connects to various data bases, and transmits or receives data, thereby conducting writing, read-out and renewal of the contents.

The floppy disk drive 712 reads data or a program from the floppy disk 714, and provide it to the CPU 700. The CD-ROM drive 716 reads data or a program from the CD-ROM 718, and provides it to the CPU 700. The communication interface 706 connects to the network 10, and transmits or receives data. The display unit 708 displays image data or results of totaling.

Software executed by the CPU 700 is provided to a user in a state where it is stored in a recording medium such as the floppy disk 714 or the CD-ROM 718. The software stored in the recording medium may be either compressed or uncompressed. The software is installed from the recording medium in the hard disk drive 710, read out to the RAM 704 and executed by the CPU 700.

The software stored in the recording medium and provided, that is to say, the software installed in the hard disk drive 710 has the receiving function, the output function, the totaling function, the photographed image-obtaining function, the pH value-obtaining function, the judging function, the COD-obtaining function, the computing function, the comparison function, the processing function, the input function, the image control function, the measured value control function and the predetermined value control function as the functional constitution. These respective functions work on the computer to allow it to conduct processing, which is the same as the functions and operation of the corresponding members in the central control device 20 in this embodiment. Accordingly, descriptions thereof are omitted.

In the floppy disk 714 or the CD-ROM 718 shown as an example in FIG. 16, a part of the operation or all functions of the central control device 20 in all embodiments described in this specification can be stored.

The program may be directly read out from the recording medium to the RAM to execute it, or after the program is once installed in the hard disk drive, it may be read out to the RAM to execute it. Further, the above-mentioned program may be stored either in a single recording medium or in a plurality of recording media. Furthermore, a module stored in the recording medium may provide the respective functions in cooperation with an operating system. For example, it may be applied to the operating system to conduct a part or all of the functions, and the functions may be provided on the basis of a reply from the operating system.

The program or module shown above may be stored in an external recording medium. As the recording media, there are available an optical recording medium such as a DVD or a PD, a magnetic optical recording medium such as an MD, a tape medium, a magnetic recording medium and a semiconductor memory such as an IC card or a miniature card, as well as the floppy disk and the CD-ROM. Further, a storing device such as a hard disk or a RAM mounted in a server system connected to an exclusive communication network or an internet maybe used as the recording medium, and the program may be provided to the central control device 20 through the network.

Figure 17:
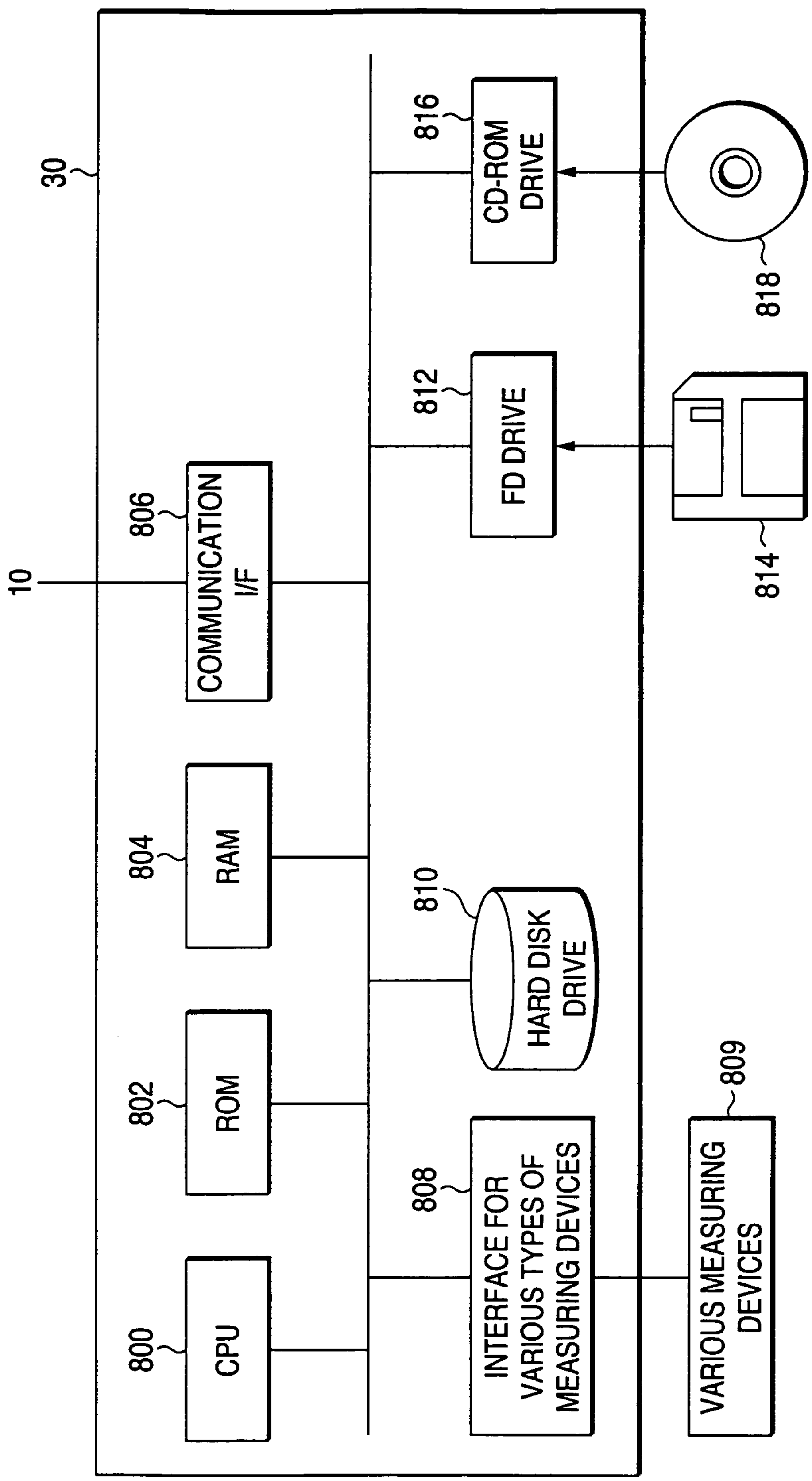
FIG. 17 is a block diagram showing the hardware constitution of the factory terminal 30.

FIG. 17 is a block diagram showing the hardware constitution of the factory terminal 30. The factory terminal 30 has a CPU 800, a ROM 802, a RAM 804, a communication interface 806, an interface 808 for various types of measurement, a hard disk drive 810, a floppy disk drive 812, and CD-ROM drive 816. The CPU 800 operates on the basis of programs stored in the ROM 802 and the RAM 804. The communication interface 806 communicates with the factory terminal 30 through the communication network 10. The hard disk drive 810 as an example of a storing device stores setting information and a program by which the CPU 800 operates. Further, the communication interface 806 may communicates with the factory terminal 30 through an exclusive line. The hard disk drive 810 connects to various data bases, and transmits or receives data, thereby conducting writing, readout and renewal of the contents. The interface 808 for various types of measurement receives data from various measuring devices 809 or transmits it. The various measuring devices 809 measure the COD value, the BOD value and the pH value. Further, the various measuring devices 809 include a function of an imaging device that photographs a state in the treatment tank.

The floppy disk drive 812 reads data or a program from the floppy disk 814, and provide it to the CPU 800. The CD-ROM drive 7816 reads data or a program from the CD-ROM 818, and provides it to the CPU 800. The communication interface 806 connects to the network 10, and transmits or receives data.

Software executed by the CPU 800 is provided to a user in a state where it is stored in a recording medium such as the floppy disk 814 or the CD-ROM 818. The software stored in the recording medium may be either compressed or uncompressed. The software is installed from the recording medium in the hard disk drive 810, read out to the RAM 804 and executed by the CPU 800.

The software stored in the recording medium and provided, that is to say, the software installed in the hard disk drive has the receiving function, the transmitting function, the COD-measuring function, the pH-measuring function, the imaging function, the adding function, the pH-adjusting function, the display function and the processing function as the functional constitution. These respective functions work on the computer to allow it to conduct processing, which is the same as the functions and operation of the corresponding members in the factory terminal 30 in this embodiment. Accordingly, descriptions thereof are omitted.

In the floppy disk 814 or the CD-ROM 818 shown as an example in FIG. 17, a part of the operation or all functions of the factory terminal 30 in all embodiments described in this specification can be stored.

The program may be directly read out from the recording medium to the RAM to execute it, or after the program is once installed in the hard disk drive, it may be read out to the RAM to execute it. Further, the above-mentioned program may be stored either in a single recording medium or in a plurality of recording media. Furthermore, a module stored in the recording medium may provide the respective functions in cooperation with an operating system. For example, it may be applied to the operating system to conduct a part or all of the functions, and the functions may be provided on the basis of a reply from the operating system.

The program or module shown above may be stored in an external recording medium. As the recording media, there are available an optical recording medium such as a DVD or a PD, a magnetic optical recording medium such as an MD, a tape medium, a magnetic recording medium and a semiconductor memory such as an IC card or a miniature card, as well as the floppy disk and the CD-ROM. Further, a storing device such as a hard disk or a RAM mounted in a server system connected to an exclusive communication network or an internet may be used as the recording medium, and the program may be provided to the factory terminal 30 through the network.

Although the invention has been described above with reference to preferred embodiments, it is to be understood that the scope of the invention is not limited to the description of the embodiments described above. Various modifications and improvements can be made in the embodiments described above. For example, in the central control system according to this embodiment, the factory terminal 30 connects to the treatment tank 90, and instructs addition of the nutrient source and the like. Instead of this, however, central control device 20 may directly connect to the treatment tank 90, and may instruct addition of the nutrient source and the like. It will be apparent from the description of the appended claims that embodiments in which such modifications and improvements are made are also within the scope of the invention.

As apparent from the above-mentioned description, according to the wastewater treatment control system of the invention, the wastewater containing a specific compound such as the hardly biodegradable compound can be effectively treated using the microorganism. In particular, when the wastewater containing the hardly biodegradable compound is treated, both can be reduced with high effectiveness.

The entire disclosure of each and every foreign patent application from which the benefit of foreign priority has been claimed in the present application is incorporated herein by reference, as if fully set forth.

What is claimed is:

1. A wastewater treatment control system for controlling a treatment tank for treating wastewater with a microorganism that can degrade a specific compound, which comprises:

a terminal for obtaining data relating to the treatment tank; and a central control device communicating with the terminal through a network, wherein the terminal has:

a concentration-measuring unit for measuring a characteristic value corresponding to a concentration of the specific compound in the treatment tank; and a transmitting unit for transmitting the characteristic value measured by the concentration-measuring unit before and after treatment to the central control device, and wherein the central control device receives the before-treatment and after-treatment characteristic values of the treatment tank from the terminal.

2. The wastewater treatment control system according to claim 1, wherein the specific compound is not degraded with commonly used activated sludges which include miscellaneous microorganisms.

3. The wastewater treatment control system according to claim 1, wherein the treatment tank comprises two or more tanks.

4. A central control device for controlling a plurality of treatment tanks for treating wastewater in which the treatment tanks are located in a place physically apart from the central control device, which comprises:

a receiving unit for receiving:

a characteristic value corresponding to a concentration of a specific compound in each of the treatment tanks before treatment; and a characteristic value corresponding to a concentration of the specific compound after treatment, so that the characteristic values are associated with each of the treatment tanks;

a computing unit for computing a difference between the characteristic value before treatment and the characteristic value after treatment received by the receiving unit; and a concentration storing unit for storing difference information indicating the difference between the characteristic value before treatment and the characteristic value after treatment computed by the computing unit.

5. The central control device according to claim 4, wherein a microorganism for degrading a material contained in wastewater is added to each treatment tank, and the central control device comprises:

a storing unit for storing microorganism-specifying information for specifying the microorganism, so that the information is associated with each of the treatment tanks; and a totaling unit for summarizing the difference between the concentration before treatment and the concentration after treatment computed by the computing unit, for each identical microorganism-specifying information.

6. A central control device for controlling a plurality of treatment tanks for treating wastewater, which comprises:

a predetermined value-storing unit for storing a predetermined value determined on the basis of a characteristic value corresponding to a concentration of a specific compound in each of the treatment tanks, so that the predetermined value is associated with each of the treatment tanks, a receiving unit for receiving difference information specifying a difference between the concentration of the specific compound before treatment and the concentration of the specific compound after treatment;

a comparison unit for comparing the difference between the concentration before treatment and the concentration after treatment specified by the difference information received by the receiving unit, to the predetermined value stored in the predetermined value-storing unit; and a processing unit for conducting predetermined treatment on the basis of the results of comparison by the comparison unit.

7. A wastewater treatment control system for controlling a wastewater treatment of using an activated sludge tank containing a microorganism that can degrade a hardly biodegradable compound, in which the system comprises:

a measuring unit for measuring a BOD value and a characteristic value corresponding to a concentration of the hardly biodegradable compound in wastewater before and after treatment; and a controlling unit for controlling the wastewater treatment on the basis of the BOD value and the characteristic value before and after treatment.

8. A wastewater treatment control system for controlling a wastewater treatment of using an activated sludge tank containing a microorganism that can degrade a hardly biodegradable compound, wherein the system comprises a terminal for obtaining data for control and a central control device communicating with the terminal through a communication network, wherein the terminal has:

a measuring unit for measuring a BOD value and a characteristic value corresponding to a concentration of the hardly biodegradable compound before and after treatment as the data for control; and a transmitting unit for transmitting the data for control measured by the measuring unit to the central control device, and wherein the central control device receives the data for control from the terminal and controls the wastewater treatment on the basis of the data received.

9. The wastewater treatment control system according to claim 7 or 8, wherein the activated sludge tank comprises two or more tanks.

10. A central control device that can remotely control a plurality of wastewater treatment tanks for treating wastewater, in which the wastewater treatment tanks are located in a place physically apart from the central control device, wherein the central control device comprises:

a receiving unit for receiving a BOD value and a characteristic value corresponding to a concentration of a hardly biodegradable compound in each of the treatment tanks before treatment, and a BOD value and a characteristic value corresponding to a concentration of the hardly biodegradable compound in each of the treatment tanks after treatment, so that the values are associated with each of the treatment tanks;

a computing unit for computing a difference between the BOD values received by the receiving unit before and after treatment, and a difference between the characteristic values before and after treatment; and a difference information storing unit for storing difference information indicating the difference between the BOD values before and after treatment and the difference between the characteristic values before and after treatment, which have been computed by the computing unit.

11. The central control device according to claim 10, wherein a microorganism for degrading a material contained in wastewater is added to each of the treatment tanks, and the central control device comprises:

a storing unit for storing microorganism-specifying information for specifying the microorganism, so that the information is associated with each of the treatment tanks; and a totaling unit for summarizing the difference between the BOD values before and after treatment and the difference between the characteristic values before and after treatment, which have been computed by the computing unit, for each identical microorganism-specifying information.

12. A central control device for controlling a plurality of treatment tanks for treating wastewater, which comprises:

a predetermined value-storing unit for storing a predetermined value determined on the basis of a BOD value and a characteristic value corresponding to a concentration of a specific compound in each of the treatment tanks, so that the predetermined value is associated with each of the treatment tanks;

a receiving unit for receiving difference information specifying a difference between the BOD values before and after treatment and a difference between the characteristic values before and after treatment, respectively;

a comparison unit for comparing the difference between the BOD values before and after treatment and the difference between the characteristic values before and after treatment, which are specified by the difference information received by the receiving unit, to the predetermined value stored in the predetermined value-storing unit; and a processing unit for conducting predetermined wastewater treatment on the basis of the results of comparison by the comparison unit.

13. A control device for a wastewater treatment system, comprising:

a receiving unit configured to receive before-treatment and after-treatment characteristic values of at least one characteristic from the wastewater treatment system; and a processing unit configured to determine control information and send the control information to the wastewater treatment system, wherein the control information include adjustments to parameters regarding a microorganism utilized in the wastewater treatment system based on before-treatment and after-treatment characteristic values.

14. The control device of claim 13, wherein the at least one characteristic includes a COD concentration in the wastewater.

15. The control device of claim 14, wherein the at least one characteristic further includes a BOD concentration in the wastewater.

16. The control device of claim 13, wherein:

the water treatment system includes a plurality of treatment tanks, the before-treatment characteristic value is a value of the characteristic at the input of the first treatment tank, and the after-treatment characteristic value is the value of the characteristic at the output of the last treatment tank.

17. The control device of claim 16, wherein:

the receiving unit is configured to receive one or more interim-treatment characteristic values, each interim characteristic value corresponding to the value of the at least one characteristic in between successive treatment tanks, and the processing unit is configured to determine the adjustments to the parameters regarding the microorganism based on the one or more interim-treatment characteristic values.

18. The control device of claim 17, wherein:

the microorganism is utilized in one or more of the plurality of the treatment tanks, and the processing unit is configured to determine the adjustments to the parameters regarding the microorganism for each treatment tank that the microorganism is being utilized.

19. The control device of claim 18, wherein the adjustments to parameters regarding the microorganism include one or more of adding more of the microorganism, adding more activated sludge, and adding nutriments for the microorganism for the each treatment tank that the microorganism is being utilized.

20. The control device of claim 13, wherein the adjustments to parameters regarding the microorganism include one or more of adding more of the microorganism, adding more activated sludge, and adding nutriments for the microorganism.

21. The control device of claim 13, wherein the microorganism is cultivated to biograde a specific compound.

22. The control device of claim 21, wherein the specific compound includes one or more of aromatic hydrocarbon compounds, organic solvents, organic chlorine compounds, organic aminocarboxylic acids, electroless plating wastewater, and surfactants of nonyl phenol derivatives.

23. The control device of claim 22, wherein the organic aminocarboxylic acids include one or more of EDTA, DPTA, and PDTA.

24. The control device of claim 13, wherein the processing unit is configured to determine the adjustments to the parameters regarding the microorganism based a predetermined characteristic value.

25. The control device of claim 17, wherein the processing unit is configured to determine the adjustments to the parameters regarding the microorganism also a predetermined characteristic value for each treatment tank that the microorganism is being utilized.

26. The control device of claim 13, wherein:

the receiving unit is configured to receive a pH value from the wastewater treatment system, and the control information include an adjustment to the pH value based on the received pH value.

27. The control device of claim 26, wherein the processing unit is configured to determine the adjustment to the pH value based on a predetermined pH value.

28. The control device of claim 17, wherein:

the receiving unit is configured to receive a pH value of each treatment tank that the microorganism is being utilized, and the control information include an adjustment to the pH value based on the received pH value for each treatment tank.

29. The control device of claim 28, wherein the processing unit is configured to determine the adjustment to the pH value for each treatment tank based on a predetermined pH value for each treatment tank.

30. The control device of claim 13, wherein:

the receiving unit is configured to receive an image of a treatment tank from the wastewater treatment system, and the control information include an indication abnormality based on an analysis of the image.

31. The control device of claim 30, wherein the analysis of the image is performed by a user.

32. The control device of claim 17, wherein:

the receiving unit is configured to receive one or more images corresponding to the one or more treatment tanks utilizing the microorganism, and the control information include an indication abnormality based on an analysis of the one or more images.

33. The control device of claim 32, wherein the analysis of the one or more images is performed by a user.

* * * * *